(12) United States Patent
Pitchford et al.

(10) Patent No.: US 9,105,181 B2
(45) Date of Patent: Aug. 11, 2015

(54) SYSTEMS AND METHODS FOR GENERATING POWER THROUGH THE FLOW OF WATER

(75) Inventors: Barth R. Pitchford, Fairfax, VA (US); William D. Pitchford, Fairfax, VA (US); Robert P. Simon, Fairfax, VA (US); Steven Nagel, Maryland Heights, MO (US); Benedict J. Nardi, Thurmont, MD (US); Russell S. Smith, Boyds, MD (US)

(73) Assignee: Mueller International, LLC, Atlanta, GA (US)

( * ) Notice: Subject to any disclaimer, the term of this patent is extended or adjusted under 35 U.S.C. 154(b) by 266 days.

(21) Appl. No.: 13/492,410

(22) Filed: Jun. 8, 2012

(65) Prior Publication Data

US 2013/0113631 A1 May 9, 2013

Related U.S. Application Data

(63) Continuation-in-part of application No. 11/760,200, filed on Jun. 8, 2007, now Pat. No. 8,279,080.

(60) Provisional application No. 61/495,714, filed on Jun. 10, 2011, provisional application No. 60/811,765, filed on Jun. 8, 2006, provisional application No. 60/869,501, filed on Dec. 11, 2006.

(51) Int. Cl.
| | |
|---|---|
| *G08B 23/00* | (2006.01) |
| *G08C 15/06* | (2006.01) |
| *G08C 17/02* | (2006.01) |

(Continued)

(52) U.S. Cl.
CPC ............... *G08C 17/02* (2013.01); *G01D 4/004* (2013.01); *G01D 21/00* (2013.01); *G01F 3/12* (2013.01); *G01F 15/063* (2013.01); *Y02B 90/242* (2013.01); *Y02B 90/246* (2013.01); *Y02B 90/248* (2013.01);

(Continued)

(58) Field of Classification Search
None
See application file for complete search history.

(56) References Cited

U.S. PATENT DOCUMENTS

| 2,556,854 A | 6/1951 | Spears et al. |
|---|---|---|
| 3,085,407 A | 4/1963 | Tomlinson |

(Continued)

FOREIGN PATENT DOCUMENTS

| WO | 03007001 | 1/2003 |
|---|---|---|
| WO | 2007146121 | 12/2007 |
| WO | 2012170885 | 12/2012 |

OTHER PUBLICATIONS

Pitchford, Barth; PCT Application entitled: Systems and Methods for Generating Power Through the Flow of Water, having serial No. PCT/US13/42467, filed May 23, 2013, 74 pgs.

(Continued)

*Primary Examiner* — Travis Hunnings
(74) *Attorney, Agent, or Firm* — Taylor English Duma LLP

(57) ABSTRACT

A remote water meter monitoring system is provided. A mesh network-type transceiver unit is coupled to a water meter housing having a water counting mechanism inside to transmit water consumption information as well as other sensor information, such as backflow detection, water pressure, and water metrics (e.g., residual chlorine and temperature) to a central server system via a bridge device and a corresponding mesh network. Mechanical energy from the water flowing through the water meter housing is converted to electrical energy via an energy conversion unit. An electrically powered shut off valve is remote addressable via the transceiver unit.

26 Claims, 30 Drawing Sheets

(51) Int. Cl.
*G01D 4/00* (2006.01)
*G01D 21/00* (2006.01)
*G01F 3/12* (2006.01)
*G01F 15/06* (2006.01)

(52) U.S. Cl.
CPC ............... *Y04S 20/322* (2013.01); *Y04S 20/42* (2013.01); *Y04S 20/52* (2013.01)

(56) References Cited

U.S. PATENT DOCUMENTS

| | | | |
|---|---|---|---|
| 3,172,364 A | 3/1965 | Barotz | |
| 3,366,865 A | 1/1968 | Shapiro | |
| 3,564,919 A | 2/1971 | Varga | |
| 4,124,835 A | 11/1978 | Cahill, Jr. | |
| 4,187,441 A | 2/1980 | Oney | |
| 4,450,715 A | 5/1984 | Sumal | |
| 4,729,106 A | 3/1988 | Rush et al. | |
| 4,940,976 A | 7/1990 | Gastouniotis et al. | |
| 5,069,785 A | 12/1991 | Miller et al. | |
| 5,086,806 A | 2/1992 | Engler et al. | |
| 5,149,984 A | 9/1992 | Schultz et al. | |
| 2,666,155 A | 1/1994 | Kaplan | |
| 5,297,635 A | 3/1994 | McHugh | |
| 5,298,894 A | 3/1994 | Cerny et al. | |
| 5,334,899 A | 8/1994 | Skybak | |
| 5,440,185 A | 8/1995 | Allwine | |
| 5,495,239 A | 2/1996 | Ouellette | |
| 5,659,300 A | 8/1997 | Dresselhuys et al. | |
| 5,877,703 A | 3/1999 | Bloss et al. | |
| 6,037,696 A | 3/2000 | Sromin et al. | |
| 6,051,892 A | 4/2000 | Toal | |
| 6,084,326 A | 7/2000 | Nagai | |
| 6,177,746 B1 | 1/2001 | Tupper et al. | |
| 6,181,048 B1 | 1/2001 | Smith | |
| 6,218,995 B1 | 4/2001 | Higgins et al. | |
| 6,246,677 B1 | 6/2001 | Nap et al. | |
| 6,300,689 B1 | 10/2001 | Smalser | |
| 6,327,541 B1* | 12/2001 | Pitchford et al. | ............... 702/62 |
| 6,351,223 B1 | 2/2002 | DeWeerd et al. | |
| 6,414,605 B1 | 7/2002 | Walden et al. | |
| 6,489,895 B1 | 12/2002 | Apelman | |
| 6,657,552 B2 | 12/2003 | Belski et al. | |
| 6,661,112 B2 | 12/2003 | Zeier et al. | |
| 6,798,080 B1 | 9/2004 | Baarman et al. | |
| 6,819,292 B2 | 11/2004 | Winter | |
| 6,831,896 B1 | 12/2004 | Lempio et al. | |
| 6,885,114 B2 | 4/2005 | Baarman et al. | |
| 7,088,012 B2 | 8/2006 | Gizara | |
| 7,112,892 B2 | 9/2006 | Mahowald | |
| 7,190,088 B2 | 3/2007 | Heidel | |
| 7,360,413 B2 | 4/2008 | Jeffries et al. | |
| 7,605,485 B2* | 10/2009 | Pitchford et al. | ............... 290/43 |
| 7,671,480 B2* | 3/2010 | Pitchford et al. | ............... 290/43 |
| 7,880,641 B2 | 2/2011 | Parris et al. | |
| 8,279,080 B2* | 10/2012 | Pitchford et al. | ........ 340/870.02 |
| 2002/0054619 A1 | 5/2002 | Haas | |
| 2002/0083778 A1 | 7/2002 | Hamilton | |
| 2003/0002909 A1 | 1/2003 | Jeffries et al. | |
| 2003/0136196 A1 | 7/2003 | Wiklund et al. | |
| 2004/0078350 A1 | 4/2004 | Hattori | |
| 2004/0113812 A1 | 6/2004 | Bianchi et al. | |
| 2004/0123656 A1 | 7/2004 | Castleberry et al. | |
| 2004/0162477 A1 | 8/2004 | Okamura | |
| 2005/0161949 A1 | 7/2005 | Baarman et al. | |
| 2005/0212710 A1 | 9/2005 | Winter | |
| 2005/0285807 A1 | 12/2005 | Zehngut | |
| 2006/0045105 A1 | 3/2006 | Dobosz et al. | |
| 2006/0114121 A1 | 6/2006 | Cumeralto et al. | |
| 2006/0163165 A1 | 7/2006 | Frank | |
| 2006/0168611 A1 | 7/2006 | Fima | |
| 2006/0174707 A1 | 8/2006 | Zhang | |
| 2006/0240823 A1 | 10/2006 | Jiao et al. | |
| 2006/0245467 A1 | 11/2006 | Casella et al. | |
| 2007/0008171 A1 | 1/2007 | Bowman | |
| 2007/0090059 A1 | 4/2007 | Plummer et al. | |
| 2007/0279061 A1* | 12/2007 | Erickson et al. | ............... 324/322 |
| 2008/0042873 A1 | 2/2008 | Harvey et al. | |
| 2008/0048882 A1 | 2/2008 | Paugh et al. | |
| 2009/0058088 A1* | 3/2009 | Pitchford et al. | ............... 290/50 |
| 2009/0309755 A1 | 12/2009 | Williamson et al. | |
| 2010/0026515 A1* | 2/2010 | Lazar et al. | ............... 340/870.02 |
| 2010/0219982 A1 | 9/2010 | Willessot | |

OTHER PUBLICATIONS

Pitchford, Barth; European Search Report for serial No. EP07795898.1, filed on Jun. 8, 2007, mailed May 28, 2013, 11 pgs.
Pitchford, Barth; International Search Report and Written Opinion for serial No. PCT/US13/42467, filed May 23, 2013, mailed Nov. 22, 2013, 10 pgs.
Pitchford, Barth; Corrected Notice of Allowance U.S. Appl. No. 11/760,200, filed Jun. 8, 2007, mailed Sep. 17, 2012, 2 pgs.
Pitchford, Barth; International Search Report and Written Opinion for serial No. PCT/US07/13505, filed Jun. 8, 2007, mailed Feb. 14, 2008, 6 pgs.
Pitchford, Barth; U.S. Appl. No. entitled: Systems and Methods for Remote Water Metering, having U.S. Appl. No. 60/811,765, filed Jun. 8, 2006, 60 pgs.
Pitchford, Barth; U.S. Appl. No. entitled: Systems and Methods for Remote Utility Metering and Meter Monitoring, having U.S. Appl. No. 11/460,200, filed Jun. 8, 2007, 40 pgs.
Pitchford, Barth; Non-Final Office Action for U.S. Appl. No. 11/760,200, filed Jun. 8, 2007, mailed Nov. 25, 2011, 15 pgs.
Pitchford, Barth; Notice of Allowance for U.S. Appl. No. 11/760,200, filed Jun. 8, 2007, mailed May 9, 2012, 10 pgs.
Pitchford, Bart; Issue Notification for U.S. Appl. No. 11/760,200, filed Sep. 8, 2007, mailed Sep. 13, 2012, 1 pg.
Pitchford, Barth; U.S. Appl. No. entitled: Systems and Methods for Generating Power Through the Flow of Water, having U.S. Appl. No. 12/038,151, filed Feb. 27, 2008, 40 pgs.
Pitchford, Barth; Restriction Requirement for U.S. Appl. No. 12/038,151, filed Feb. 27, 2008, mailed Jul. 29, 2008, 7 pgs.
Pitchford, Barth; Non-Final Office Action for U.S. Appl. No. 12/038,151, filed Feb. 27, 2008, mailed Nov. 19, 2008, 11 pgs.
Pitchford, Barth; Notice of Allowance for U.S. Appl. No. 12/038,151, filed Feb. 27, 2008, mailed Jun. 5, 2009, 8 pgs.
Pitchford, Barth; Issue Notification for U.S. Appl. No. 12/038,151, filed Feb. 27, 2008, mailed Sep. 30, 2009, 1 pg.
Pitchford, Barth; U.S. Appl. No. entitled: Systems and Methods for Generating Power Through the Flow of Water, having U.S. Appl. No. 61/495,714, filed Jun. 10, 2011, 71 pgs.
Pitchford, Barth; U.S. Appl. No. entitled: Systems and Methods for Remote Utility Metering and Meter Monitoring, having U.S. Appl. No. 12/201,429, filed Aug. 29, 2008, 64 pgs.
Pitchford, Barth; Non-Final Office Action for U.S. Appl. No. 12/201,429, filed Aug. 29, 2008, mailed Apr. 10, 2009, 8 pgs.
Pitchford, Barth; Notice of Allowance for U.S. Appl. No. 12/201,429, filed Aug. 29, 2008, mailed Oct. 13, 2009, 8 pgs.
Pitchford, Barth; Issue Notification for U.S. Appl. No. 12/201,429, filed Aug. 29, 2008, mailed Feb. 10, 2010, 1 pg.
Pitchford, Barth; U.S. Appl. No. entitled: Systems and Methods for Remote Utility Metering and Meter Monitoring, having U.S. Appl. No. 13/585,046, filed Aug. 14, 2012, 71 pgs.
Pitchford, Barth; International Preliminary Report on Patentability for serial No. PCT/US07/13505, filed Jun. 8, 2007, mailed Dec. 10, 2008, 6 pgs.
Pitchford, Barth; International Search Report for serial No. PCT/US12/41658, filed Jun. 8, 2012, mailed Aug. 21, 2012, 2 pgs.
Pitchford, Barth; International Preliminary Report on Patentability for serial No. PCT/US12/41658, filed Jun. 8, 2012, mailed Dec. 10, 2013, 6 pgs.
Pitchford, Barth; Canadian Office Action for serial No. 2,653,092, filed Jun. 8, 2007, mailed Jan. 6, 2014, 3 pgs.
Pitchford, Barth Robins; Non-Final Office Action for U.S. Appl. No. 13/585,046, filed Aug. 14, 2012, mailed Aug. 19, 2014, 44 pgs.

(56) References Cited

OTHER PUBLICATIONS

Pitchford, Barth Robins; Notice of Allowance for U.S. Appl. No. 13/585,046, filed Aug. 14, 2012, mailed Nov. 25, 2014, 12 pgs.
Pitchford, Barth Robins; Issue Notification for U.S. Appl. No. 13/585,046, filed Aug. 14, 2012, mailed Mar. 11, 2015, 1 pg.
Pitchford, Barth Robins; Supplemental Notice of Allowability for U.S. Appl. No. 13/585,046, filed Aug. 14, 2012, mailed Feb. 27, 2015, 7 pgs.
Pitchford, Barth; International Preliminary Report on Patentability for serial No. PCT/US13/42467, filed May 23, 2013, mailed Dec. 18, 2014, 8 pgs.

* cited by examiner

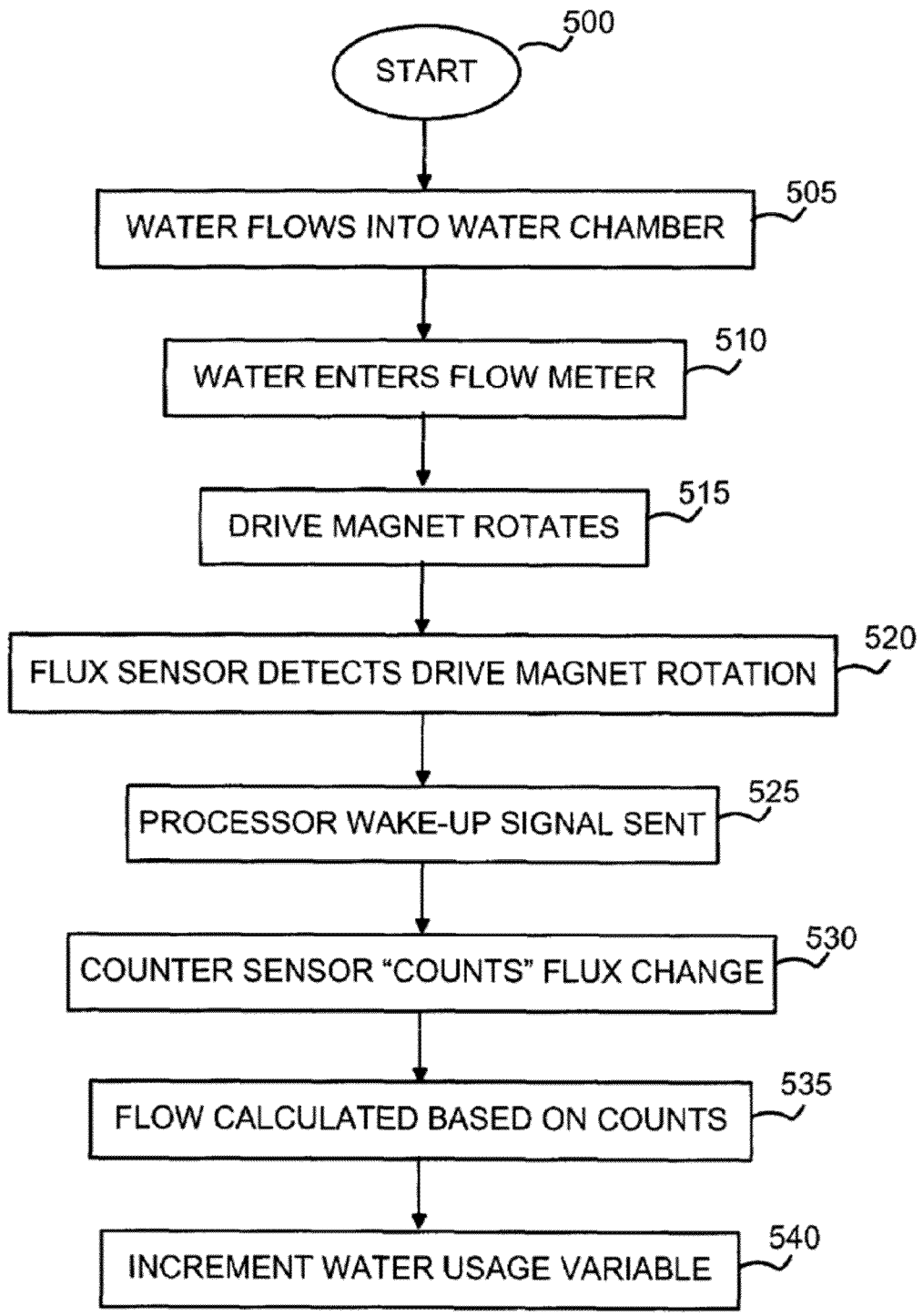

Alternator operation
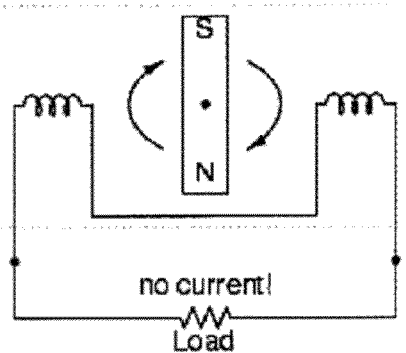
Step #1
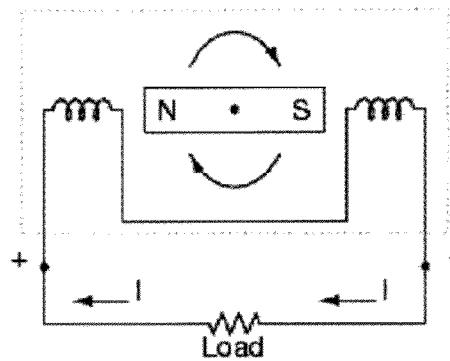
Step #2
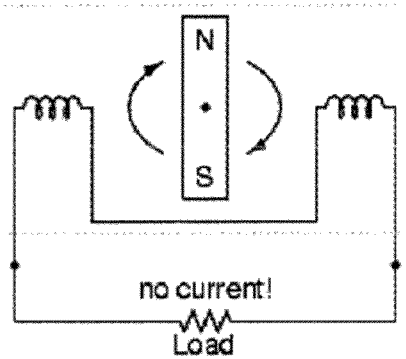
Step #3
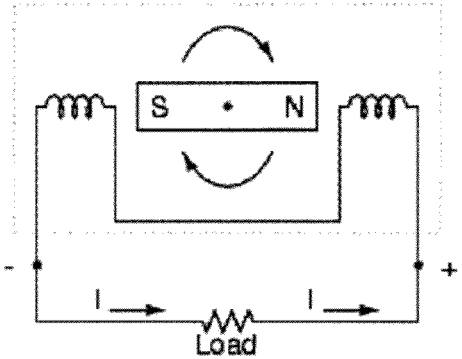
Step #4
FIGURE 19

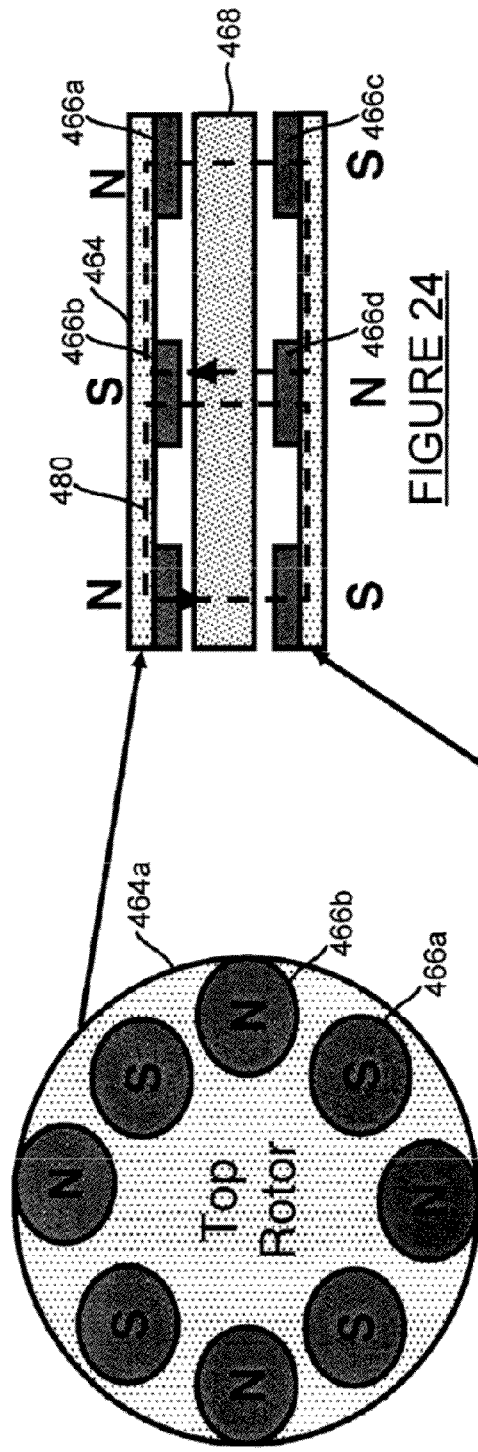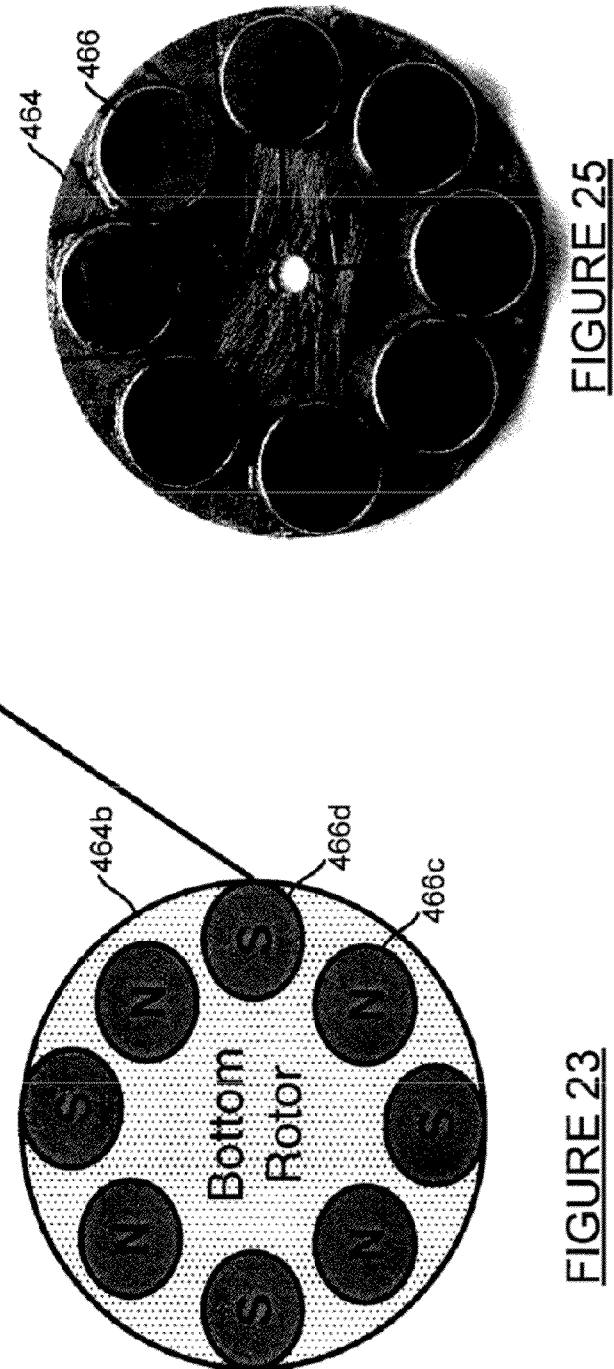
FIGURE 24
FIGURE 25
FIGURE 23

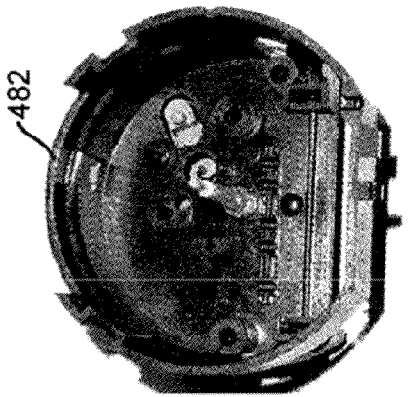
FIGURE 28
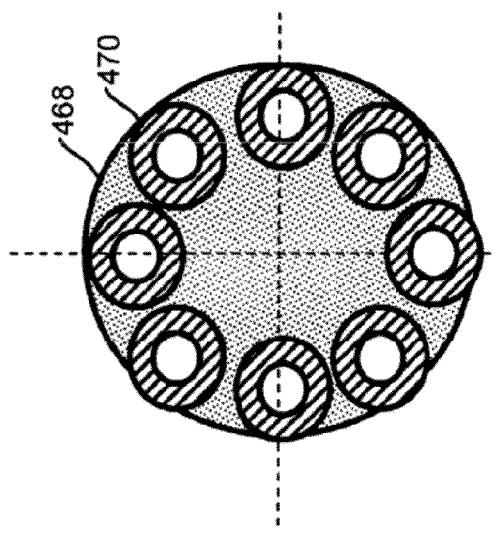
FIGURE 27
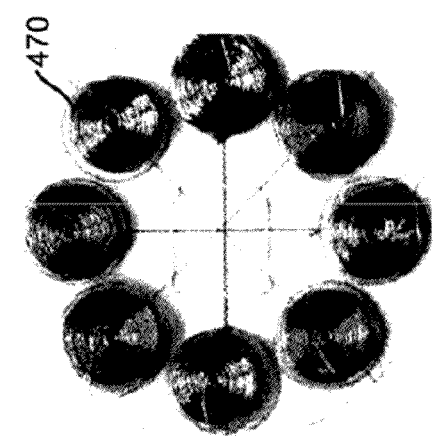
FIGURE 26
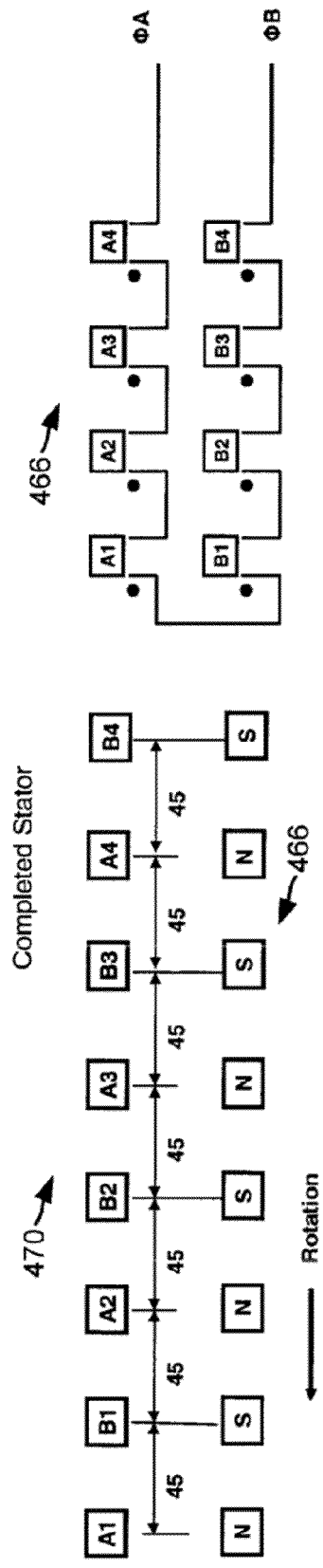
FIGURE 30
FIGURE 29

Sensus Meter

| GPM | RPM | Vp-p (H.P. Calc) | Vp-p (J.A. Calc) | Vp-p (Measured) | Vdc (Measured) |
|---|---|---|---|---|---|
| 1 | 56 | 2.16 | 2.25 | 2.8 | |
| 2 | 112 | 4.23 | 4.49 | 6.8 | 6.06 |
| 5 | 280 | 10.58 | 11.23 | 12.4 | 12 |
| 10 | 560 | 21.16 | 22.46 | 25 | 23.5 |
| 15 | 840 | 31.73 | 33.68 | | |

Hersey Meter

| GPM | RPM | Vp-p (H.P. Calc) | Vp-p (J.A. Calc) | Vp-p (Measured) | Vdc (Measured) |
|---|---|---|---|---|---|
| 1 | 49 | 1.85 | 1.97 | 2.0 | |
| 2 | 98 | 3.7 | 3.93 | 4.4 | 3.5 |
| 5 | 245 | 9.26 | 9.82 | 10.2 | 10 |
| 10 | 490 | 18.52 | 19.65 | 22 | 20.25 |
| 15 | 735 | 27.77 | 29.47 | | |

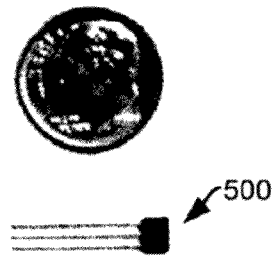
FIGURE 33
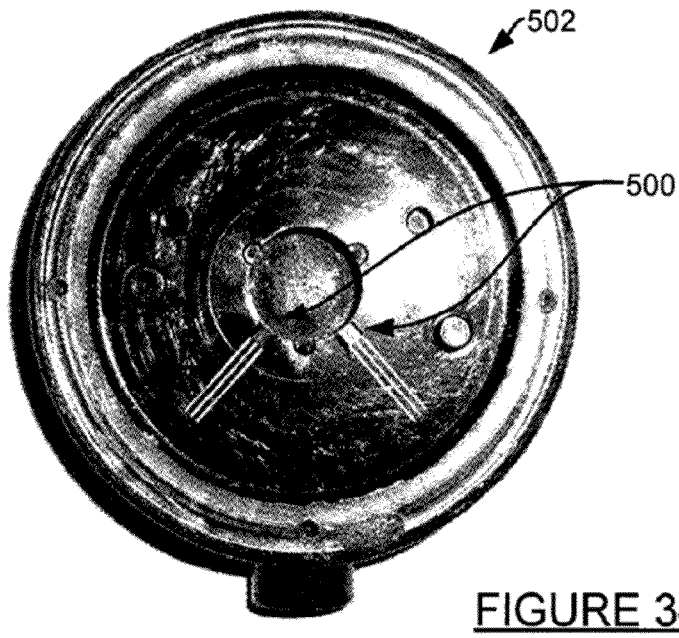
FIGURE 34
| Switch State | Meaning |
|---|---|
| 00 | The magnet is not near the switches |
| 01 | The magnet has reached the first switch |
| 11 | The magnet is between the two switches |
| 10 | The magnet has reached the second switch |
| 00 | The magnet has moved past the switches |
FIGURE 35

910 antenna design

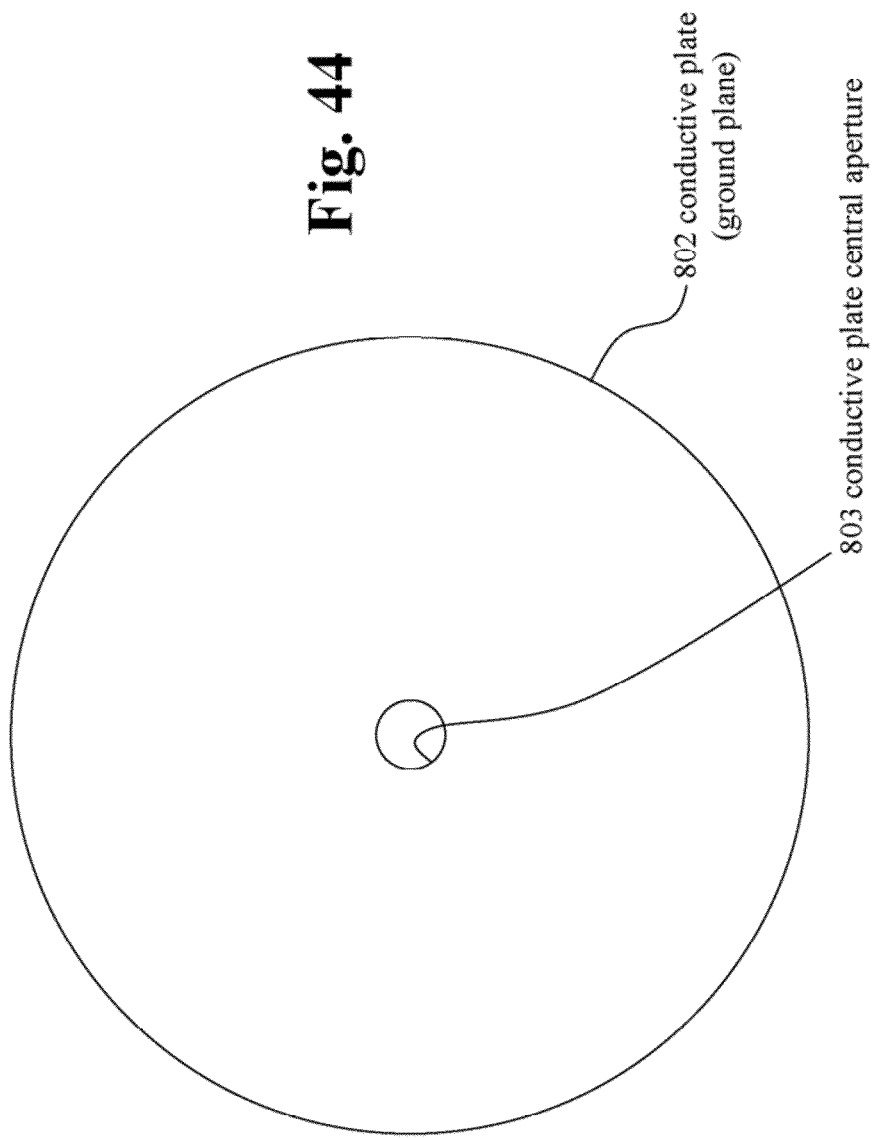

SYSTEMS AND METHODS FOR GENERATING POWER THROUGH THE FLOW OF WATER

CROSS REFERENCE TO RELATED APPLICATIONS

This patent application is a Continuation-in-part (and claims priority to) U.S. patent application Ser. No. 11/760,200 entitled "Systems and Methods for Remote Utility Metering and Meter Monitoring," filed on Jun. 8, 2007 now U.S. Pat. No. 8,279,080, which is incorporated by reference in its entirety.

This patent application claims priority to U.S. Provisional Application 61/495,714 filed on Jun. 10, 2011 entitled "Systems and Methods for Generating Power through the Flow of Water", which is incorporated by reference in its entirety.

This patent application claims priority to both U.S. Provisional Application 60/811,765 filed on Jun. 8, 2006 and U.S. Provisional Application 60/869,501 filed on Dec. 11, 2006, both entitled "Systems and Methods for Remote Water Metering", which are both incorporated by reference in their entirety.

This application is related to U.S. patent application Ser. No. 12/038,151 entitled "Systems and Methods for Generating Power through the Flow of Water" filed on Feb. 27, 2008, and now U.S. Pat. No. 7,605,485 issued Oct. 20, 2009, which is incorporated by reference in its entirety.

This application is related to U.S. patent application Ser. No. 12/201,429 entitled "Systems and Methods for Remote Utility Metering and Meter Monitoring" filed on Aug. 29, 2008, and now U.S. Pat. No. 7,671,480 issued Mar. 2, 2010, which is incorporated by reference in its entirety.

This application relates to, and incorporates by reference in their entirety, each and all of the above listed patent applications and/or patents.

FIELD OF THE INVENTION

The present invention relates generally to power generation and more specifically to power generation using the flow of water, as well as related features.

BACKGROUND OF THE INVENTION

Municipal or private water deliver systems usually deliver water from a central location through a distribution network to water customers on a cost per unit of volume basis, most often cost per gallon or cost per liter. In these systems, a water meter is typically placed between a common water supply pipe and a customer property to measure the amount of water flowing from the supply pipe to the customer. In order to bill the customer for water usage, it is necessary to periodically read the meter to determine the amount of usage over a fixed period of time. This process is referred to in the industry as metering or meter reading.

Historically, metering has been a labor intensive process, and due to the manual steps required, one that is prone to error. Some improvements have been made by utilizing automated meter reading (AMR) techniques to capture and transmit meter reading information electronically, such as to a technician with a receiving device near the meter or to another remote location. However, these automated systems still suffer from various shortcomings including limited battery life, limited transmission range, and lack of remote addressability, among others.

SUMMARY OF THE INVENTION

In view of the aforementioned shortcomings of conventional meter reading systems, at least one embodiment of the invention provides a remote water meter monitoring system. The remote water meter monitoring system according to this embodiment comprises a water meter body coupling a water supply source to a water customer, a flow sensor contained within the water meter body that is configured to measure a bidirectional flow rate of water through the water meter, a power supply system including at least one battery, at least one capacitor, at least one rectifier circuit, and a power generator, wherein the power generator is powered by a flow of water through the water meter body, a controller communicatively coupled to the water meter body and power supply system, and at least one antenna connected to the controller.

Another embodiment according to the invention provides a wireless remote water meter monitoring network. The wireless remote water meter monitoring network according to this embodiment comprises at least one central data processing system, at least one bridge device communicatively coupled to the at least one central data processing system, and a plurality of network nodes, each network node configured to perform two-way communication with the at least one bridge device, either directly or through one or more other network nodes, wherein each network node comprises a water meter housing coupling a water customer with a water supply line, a flow measurement device in the water meter housing for measuring a volume of water flowing through the meter, a power supply circuit including at least one power storage device, at least one capacitive device and a power converter, wherein the power converter is powered by water flow through the meter, and a communication circuit comprising a mesh-type controller and an antenna, wherein the communication circuit is coupled to the flow measurement device and the power supply circuit and is adapted to perform two-way communication.

Still a further embodiment according to the invention provides a circuit for a wireless water meter monitoring system. The circuit according to this embodiment comprises a mechanical energy harnessing sub-circuit for converting water flow mechanical energy into electrical energy comprising a pair of magnetically coupled rotors driven by water flow and having a plurality of magnets affixed thereto that rotate around a set of coils, thereby inducing a current in the coils, an energy storage and delivery sub-circuit comprising at least one rectifier circuit electrically coupled to the coils, at least one capacitor charged by the at least one rectifier circuit, at least one battery, and a switch for permitting the at least one battery to be charged by the at least one capacitor and for selecting either the at least one capacitor or the at least one battery to supply continuous power to the circuit and to manage charging of the at least one battery, a water flow counting sub-circuit comprising a plurality of flux change detectors that detect flux changes caused by a magnet rotating about a shaft driven by a flow sensor of a water flow chamber, a communication sub-circuit electrically coupled to the energy storage and delivery sub-circuit and the water flow counting sub-circuit comprising a mesh-type transceiver and an antenna for enabling two-way communication between the wireless water meter monitoring system and other systems, and a sensor sub-circuit electrically coupled to the energy storage and delivery sub-circuit and the communication sub-circuit for recording sensor data and comprising at least one sensor device.

These and other embodiments and advantages of the present invention will become apparent from the following detailed description, taken in conjunction with the accompanying drawings, illustrating by way of example the principles of the invention.

BRIEF DESCRIPTION OF THE DRAWINGS

FIG. 9 is a flow chart of a method for measuring water flow with a remote water meter monitoring system according to various embodiments of the invention.

FIG. 19 is an illustration of the relationship between magnetic fields and electrical coils implemented within a generator of an example embodiment of sensor and wireless mote assembly.

FIG. 23 includes elevation view of the top and bottom rotors of a generator of an example embodiment of sensor and wireless mote assembly.

FIG. 24 is a cross sectional view of the stator and rotor assembly illustrated in FIG. 20 show lines of magnetic flux between the rotors illustrated in FIG. 23.

FIG. 25 is a photograph of a prototype rotor of the generator illustrate in FIG. 20.

FIG. 26 is a photograph of a prototype stator of the generator illustrate in FIG. 20.

FIG. 27 is an elevation view of the stator of the generator illustrated in FIG. 20 provided for comparison to the photograph shown in FIG. 26.

FIG. 28 is a photograph of a housing into which the rotor and stator assembly illustrated in FIGS. 20-26 may be fitted.

FIG. 29 is a schematic diagram showing the relationship of rotor magnets to stator coils of the rotor and stator assembly illustrated in FIGS. 20-26.

FIG. 30 is a coil wiring diagram for the stator portion of the rotor and stator assembly illustrated in FIGS. 20-26.

FIG. 33 is a photograph of a Hall effect sensor for use in an embodiment sensor.

FIG. 34 is a photograph of two Hall effect sensors positioned on a housing for use as a water meter sensor.

FIG. 35 is a logic table for interpreting signals received from Hall effect sensors configured as shown in FIG. 34.

FIG. 44 is a top view of the flat, circular conductive plate (of FIG. 40) with conductive plate central aperture, in accordance with one embodiment of the invention.

These and other embodiments and advantages of the present invention will become apparent from the following detailed description, taken in conjunction with the accompanying drawings, illustrating by way of example the principles of the invention.

DETAILED DESCRIPTION

The following description is intended to convey a thorough understanding of the embodiments described by providing a number of specific embodiments and details involving systems and methods for remote water meter monitoring. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

As used herein, any term in the singular may be interpreted to be in the plural, and alternatively, any term in the plural may be interpreted to be in the singular.

Figure 1:
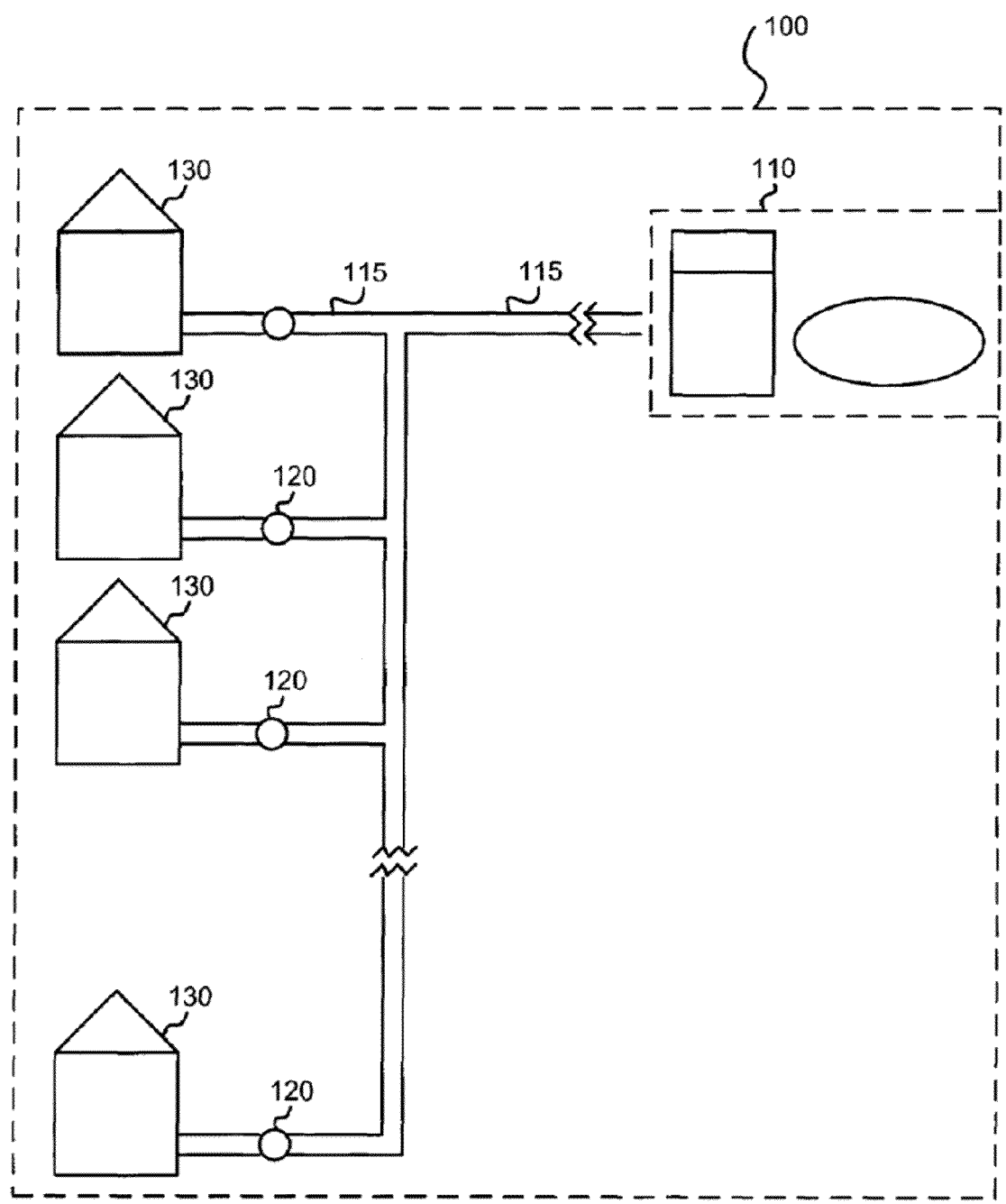
FIG. 1 is an illustration of a typical water utility distribution network beginning with a water utility supply and terminating in a plurality of water consumers.

Referring now to FIG. 1, this Figure is an illustration of a typical water utility distribution network beginning with a water utility supply and terminating in a plurality of water consumers. The network 100 begins with a water service provider 110 such as a public water utility or commercial water service provider. As is known in the art, the water service provider 110 may comprise a water reservoir and various water quality processing elements that condition the water prior to being piped to consumers. One or more water supply pipes 115 flow out of the water service provider 110 creating a water distribution network. The one or more water supply pipes 115 provide water to a plurality of water consumers 130. For ease of illustration, the water consumers 130 are illustrated as residential units. However, the water consumers may be businesses, factories, irrigations systems, or other entities that receive water from the water service provider 110.

Each water consumer 130 is coupled to the at least one water supply line 115 by a water meter 120. The water meter provides a physical interconnection between consumers 130 and the water supply line 115. The water meter 120 also measures the amount of water flowing to each consumer from the supply line 115. This data is typically used to bill the customer for their water consumption over a specified time period such as a month or quarter. The water meter 120 includes a dial, gauge, or other display that quantifies the amount of water that has passed through the meter into a number of gallons. As discussed above, in order to bill customers for their water consumption, the water utility usually sends a meter reader out to the read the number from each water meter 120. The previous reading is subtracted from this number and the corresponding numbers of gallons consumed are billed to the customer.

A conventional water meter usually includes a water chamber having a water input, a water output, and a water flow measuring device, such as a rotating, notating or oscillating disk, or other flow meter, that drives the gauge on the top surface of the meter. The meter chamber is usually made of a non-corrosive metal such as copper or bronze. Also, the pipe connecting the meter chamber usually includes a manual shut off valve that can be manually engaged to prevent water from flowing from the supply pipe 115 to the consumer 130 through the meter 120, to facilitate the repair or replacement of the water meter or other elements within the customer premises.

Figure 2:
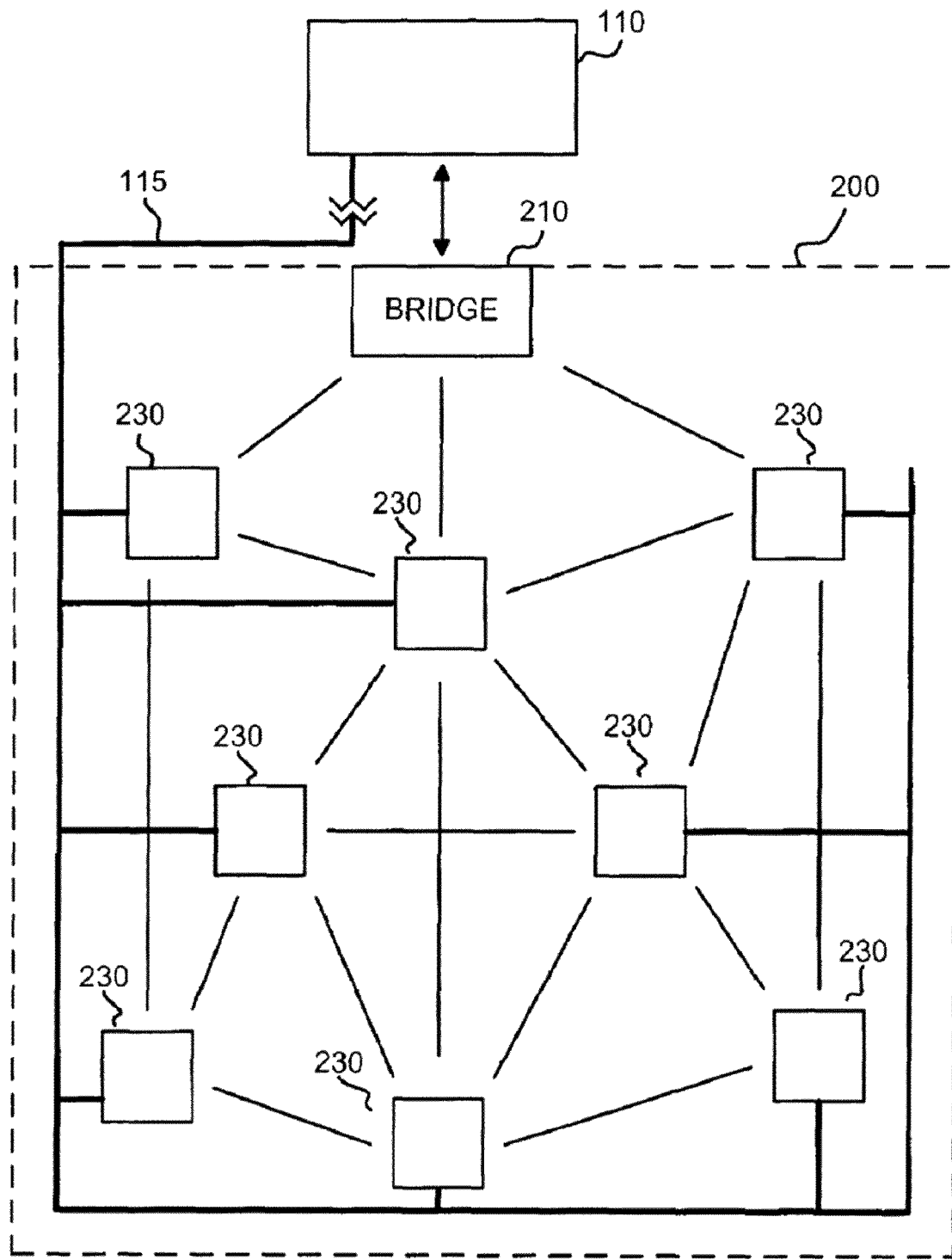
FIG. 2 is a network diagram of a remote water meter monitoring system according to various embodiments of the invention.

FIG. 2 is a network diagram of a remote water meter monitoring system according to various embodiments of the invention. The network 200 shown in FIG. 2 is similar to that of FIG. 1 in that a water service provider 110 is coupled to a plurality of water consumers via a water supply pipe 115. However, in the network 200 of FIG. 2, each water consumer is represented by a wireless communication based network node 230. For purposes of this disclosure and claims the network node 230 comprises with physical water meter housing as well as the power, control and communications circuitry. Water enters each of the consumer premises from the supply line 115 via the a water meter housing of each node 230. Each node 230 also comprises a wireless ad hoc network transceiver unit that is operable to wirelessly transmit water meter reading information to a bridge device 210, which, in turn, passes the information to one or more server computer systems associated with the water service provider 110. In various embodiments this information may be accessible over a wide area network, such as the Internet, by anyone having appropriate access credentials with a network browser, such as an Internet web browser.

The bridge device 210 may communicate with the one or more server computer systems (not shown) via a land line, a wireless cellular connection, a wireless 802.11x connection, WiFi, (including municipal WiFi and WiMAX), fiber optic connection, a cable connection, a twisted-pair copper phone line, a satellite connection, other known or previously unknown communications medium, or combinations of any of these. The specific communications medium between the bridge device 210 and the one or more server computers is not critical to the various embodiments of the invention.

With continued reference to FIG. 2, each node 230 acts as both a sensor and a data router. Each node may transmit a signal directly to the bridge device 210, or pass the information through one or more other network nodes 230. This feature of self-forming, self-healing ad hoc networks is known in the art and particularly advantageous to the various embodiments of the invention because the physical environment of the network 200 may change due to the presence of cars, trucks and other temporary obstructions within the network 200, affecting the propagation of radio frequency (RF) signals between nodes or between a node and the bridge device 210.

It should be appreciated that each network node 230 may, up load information to the bridge 210 as well as receive information and/or instructions from the bridge 210. That is, a network node 230 may repeat a signal destined for the bridge device 210 or one that is destined for another node 230. Techniques and algorithms for optimizing ad hoc or mesh networks are well known in the art. The various embodiments of the invention do not depend on any particular type or brand of ad hoc or mesh network hardware. However, in accordance with one embodiment of the invention, Internet Protocol (IP) and in particular Internet Protocol version 6 (IPv6) may be utilized, as described below. As will be discussed in greater detail herein, in the network 200, each network node 230 may upload information according to a predetermined schedule, such as, for example, once every hour. Also, an upload signal may be sent on demand, from the bridge device 210 to each of the network nodes 230 causing them to perform a specified task or to upload information to the bridge device 210.

It should be appreciated that this information may include current water meter reading information as well as other information associated with the node, such as, for example, current state, power information, temperature information, water pressure information, backflow indication, and/or any other sensor-based information from one or more electronic sensors in communication with the network node 230, as will be discussed in greater detail herein.

Figure 3:
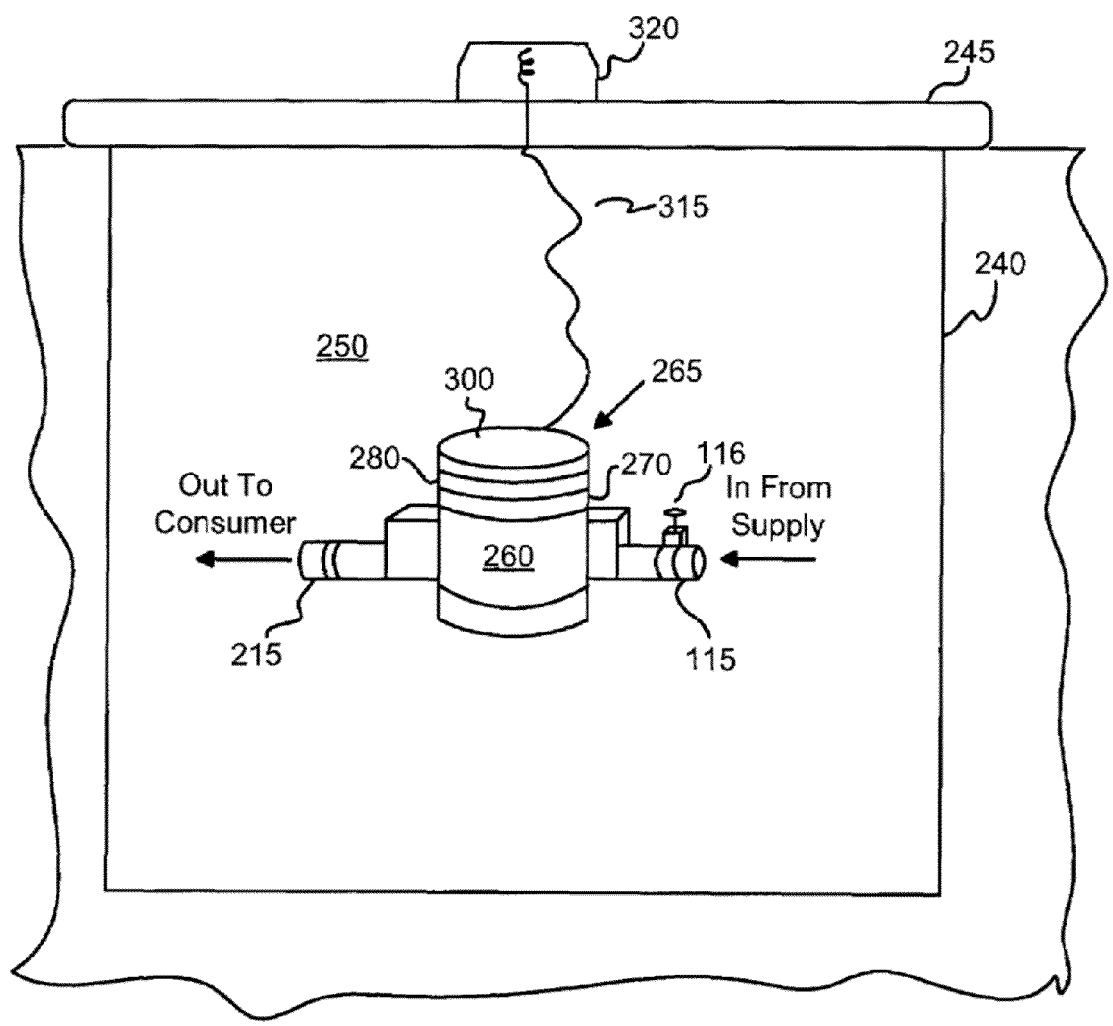
FIG. 3 is a illustration of a water meter pit including a remote water meter monitoring system according to various embodiments of the invention.

Referring now to FIG. 3, this Figure is an illustration of a water meter pit including a remote water meter monitoring system according to various embodiments of the invention. In a conventional system, a water pit typically includes a water meter, that is comprised of a water chamber and a water measurement head that is equipped with a gauge or other meter on the top and a manually shut off valve coupling the water supply line to the customer premises. In the system depicted in FIG. 3, the conventional water measurement head has been replaced with a new water measurement head, 265, according to the various embodiments of the invention. The water meter 250 may include a water chamber 260 through which water flow passes from the water supply 115 to the consumer water system 215, and a water measurement head 265 that attaches to the water chamber 260. The measurement head 265 may also include a water counting module 270 having a flow meter, a power conversion module 280 and a control module 300.

The control module 300 may also include a wireline connection 315 to an antenna 320 coupled to the meter pit cover 245, i.e., a meter lid. In various embodiments, the meter pit cover 245 may comprise a metal plate with a through-hole near the center allowing the antenna 320 to contact the wire 315. The antenna 320 may be encased in resin or plastic, or other material, in order to prevent breakage when the meter pit cover 245 is stepped on or driven over with a bicycle, car, or other vehicle. The fact that the meter pit cover 245 is a relatively massive, conductive object, it serves as an ideal ground plane for the antenna thereby increasing the range and performance of the wireless network according to the various embodiments of the invention. This is particularly advantageous for retrofitting the system according to the various embodiments of the invention to existing water supply networks. The only required modification to the meter pit cover 245 is making a through-hole and attaching the antenna 320, as shown in FIG. 3.

In further description of aspects of the antenna, in accordance with some embodiments of the invention, the METER Mote antenna design may use a cavity backed slot antenna to reduce vertical height and provide omni-directional coverage. The antenna may be embedded flush into a cast iron meter pit cover resulting in a very rugged and concealed design. RF (radio frequency) connection may be made, for example, using an SMA front mount bulkhead jack with solder cup, ensuring good electrical connectivity between the meter lid and the ground portion of the bulkhead jack. This configuration converts the meter pit cover into a ground plane that reduces ground wave absorption and increases the above ground transmission range.

As described above, the antenna may be embedded flush into a cast iron meter pit cover, in accordance with one embodiment of the invention. Relatedly, the antenna might be characterized as "embossed" into the top surface of a cast iron meter pit cover. Accordingly, such antenna designs may be used in lieu of the antenna design shown in FIG. 3 (in which the antenna extends through the cast iron meter pit cover and extends above the cover in a helical fashion). Each of such embodiments (described in this paragraph) might be characterized as a "cavity backed slotted antenna" in that portions of the antenna are in physical contact with the meter pit cover and that the meter pit covers becomes part of the antenna system which provides improved radio frequency (RF) performance, extending the range and sensitivity of the transceiver connected to said antenna system.

On the other hand, the embodiment shown in FIG. 40 (described below) might be characterized as a "sunk cavity backed slotted antenna" in that portions of the antenna are not in physical contact with the meter pit cover but incorporates the meter pit cover 245 and the conductive plate 820 into the antenna system, improving RF performance and extending the range and sensitivity or the transceiver connected to said antenna. That is, the exciter loop 820 resonates with the slot formed by the through-hole in the meter pit cover 245 and uses the conductive plate 820 as a reflector, maximizing the radiation of the RF signal out of the meter pit.

Based on experimentation and development of the cavity backed slotted antenna, such antennas are best used in the situation when a narrower frequency band is required. The cavity slotted antenna is generally used, illustratively, in conjunction with original manufacture of the meter pit cover. The reason is that the integration and/or embossing of the antenna physically into the meter pit cover is best performed in conjunction with initial manufacture of the meter pit cover.

On the other hand, based on experimentation and development of the sunk cavity slotted antenna, such antennas are best used in the situation when a broader frequency band is required. The sunk cavity slotted antenna is ideal for retrofitting existing meter pit covers in the field. The reason, as described above, is that the meter pit cover simply has to be drilled and thereafter the insert 810 is disposed in the drilled hole, as shown in FIG. 40.

Figure 41:
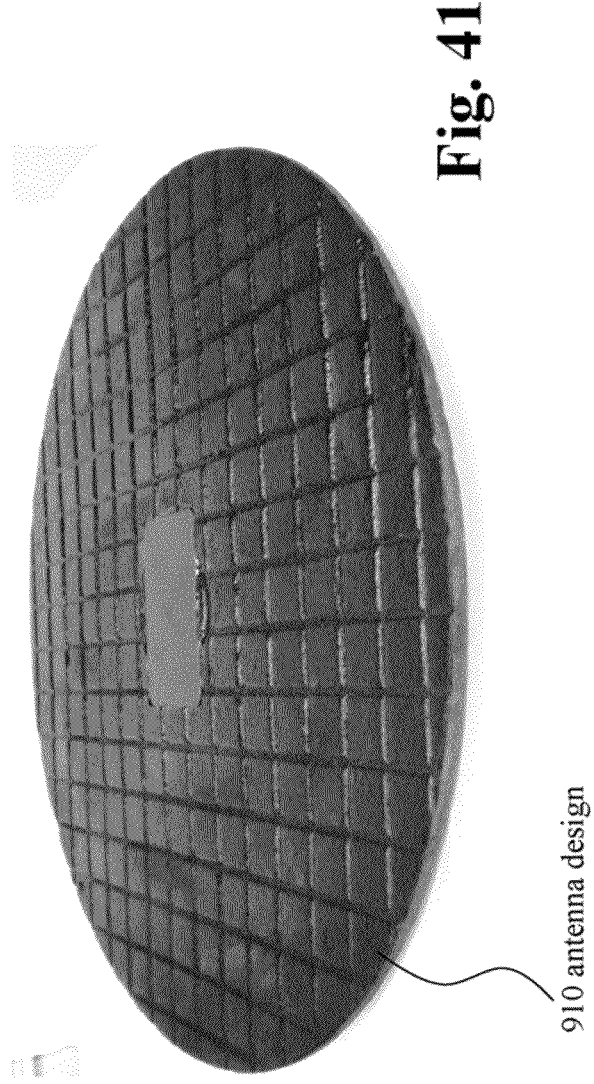
FIG. 41 shows a further embodiment of a cavity slotted antenna, in accordance with a one embodiment of the invention.

FIG. 41 shows a further embodiment of a cavity slotted antenna, in accordance with a one embodiment of the invention. As shown, the antenna design 910 uses a cavity back slot antenna to reduce vertical height and provide omni-directional coverage. The antenna is embedded flush into an existing or new meter lid resulting in a very rugged and concealed design. The design converts the meter lid into a component of the antenna system, and produces a ground plane that reduces ground wave absorption and increases the above ground transmission range.

Figure 42:
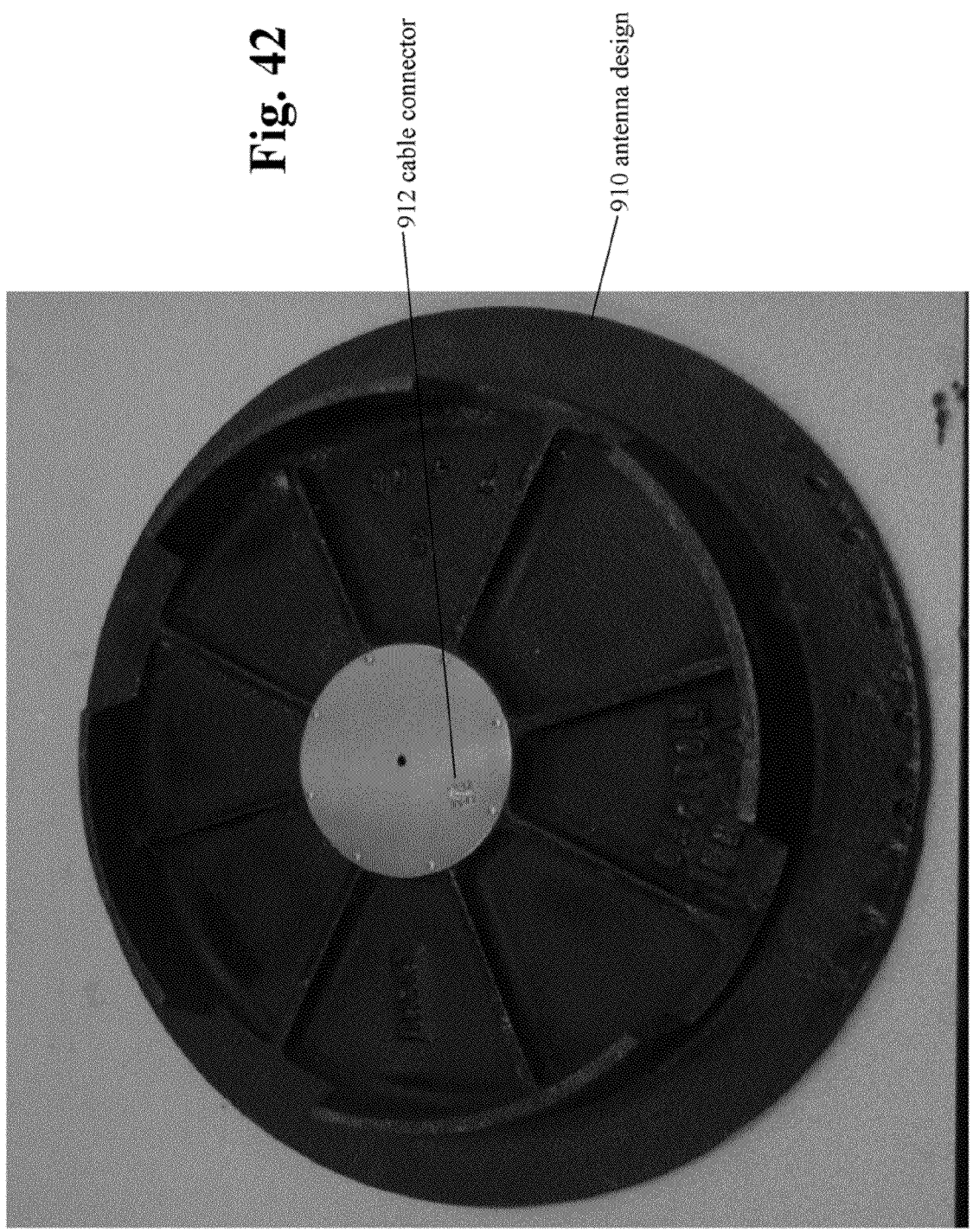
FIG. 42 is a bottom perspective view of an antenna design, in accordance with one embodiment of the invention.

FIG. 41 is a top perspective view of antenna design 910. On the other hand, FIG. 42 is a bottom perspective view of antenna design 910, in accordance with one embodiment of the invention. Relatedly, FIG. 43 is a further bottom perspective view of antenna design 910, in accordance with one embodiment of the invention.

Figure 43:
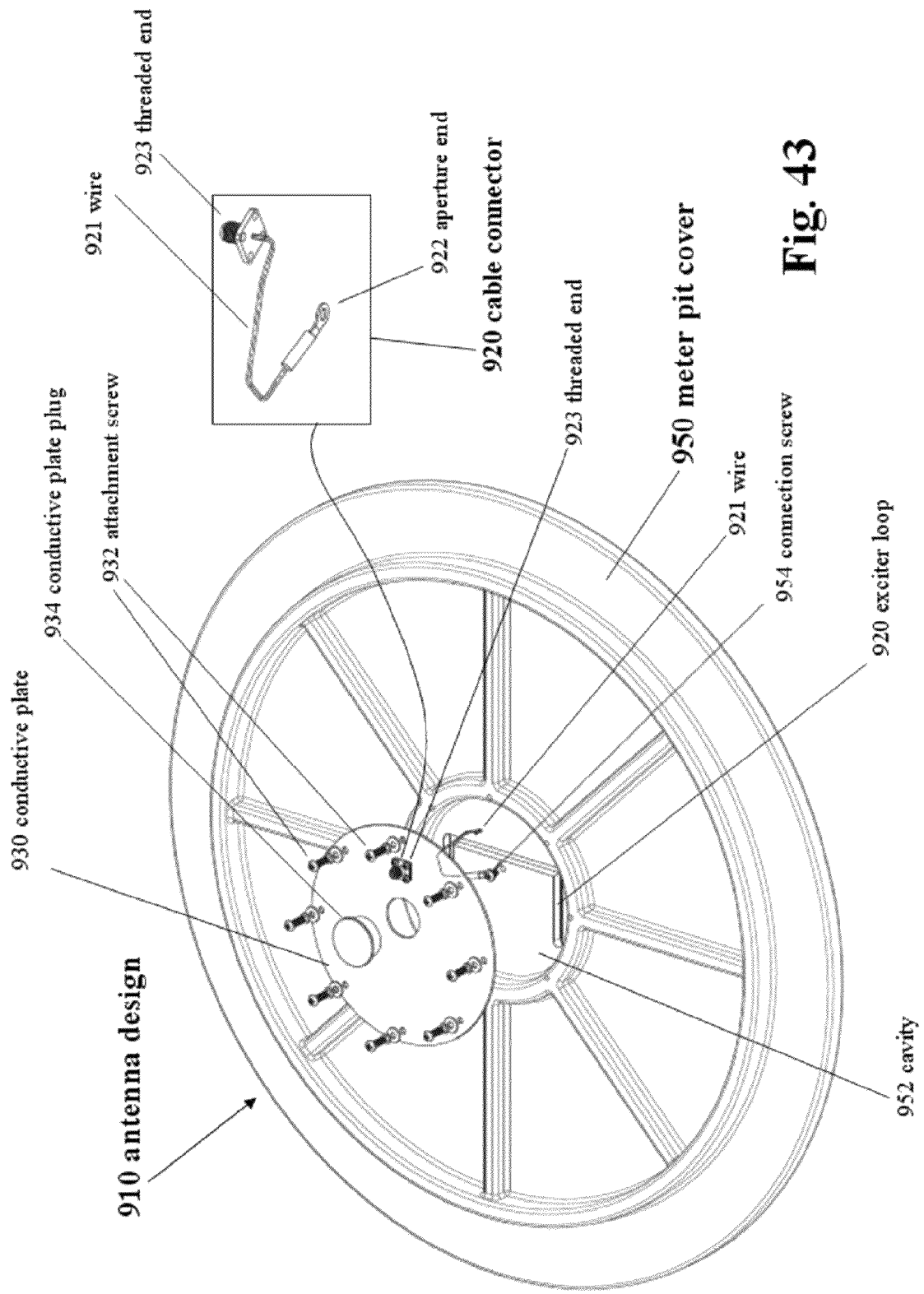
FIG. 43 is a further bottom perspective view of an antenna design, in accordance with one embodiment of the invention.

As shown in FIG. 43, the antenna design 910 includes a meter pit cover 950. The meter pit cover may be constructed of cast iron or other conductive material, or a series of radials, for example. The meter pit cover 950 includes a cavity 952 in which an exciter loop 920 is disposed. The exciter loop 920 may be constructed of suitable metal. A conductive plate 930 is fastened to the lower surface of the meter pit cover 950 as shown in FIG. 43. The conductive plate 930 may be attached to the meter pit cover 950 using a plurality of attachment screws 932. More specifically, the attachment screws 932 are received within respective threaded apertures surrounding the cavity 952, as shown.

The arrangement further includes a cable connector 920. The cable connector 920 includes a wire 921 which extends between an aperture end 922 and a threaded end 923. The aperture end 922 is fastened to the cavity 952 using a connection screw 954. Specifically, the connection screw 954 is passed through the aperture end 922 and then threadably inserted into the cavity 952—so as to fixedly attach the aperture end 922 to the cavity 952 (i.e., to the meter pit cover 950).

On the other hand, the threaded end 923 (of the cable connector 923) includes a threaded protuberance connector with square base, as shown in FIG. 43. In accordance with one embodiment of the invention, the threaded connector may be constituted by a coaxial cable female attachment end, such that a coaxial cable may be attached to the threaded end 923. The threaded protuberance connector is screwed into (or passed through) a receiving aperture in the conductive plate 930, as shown. A small nut might be screwed onto the threaded end 923 (so as to secure the threaded end 923 to the conductive plate 930. As a result, the conductive plate 930, and the connector are electrically connected to the meter pit cover 950.

A conductive plate plug 934 is removably disposed in the conductive plate 930. The conductive plate plug 934 provides for access to the interior of the cavity 952, i.e., when the conductive plate 930 is fastened on to the meter pit cover 950 (using the attachment screws 932).

In general, it is appreciated that the components of the various antennas as described herein may be varied based on the particular application of the antenna as well as the particular environment in which the antenna is utilized, for example. For example, the components of the various antennas may be varied in dimension, dimension relative to other components, relative positioning as to other components, orientation as to other components, and in the particular material that is used to construct the components, for example.

Figure 40:
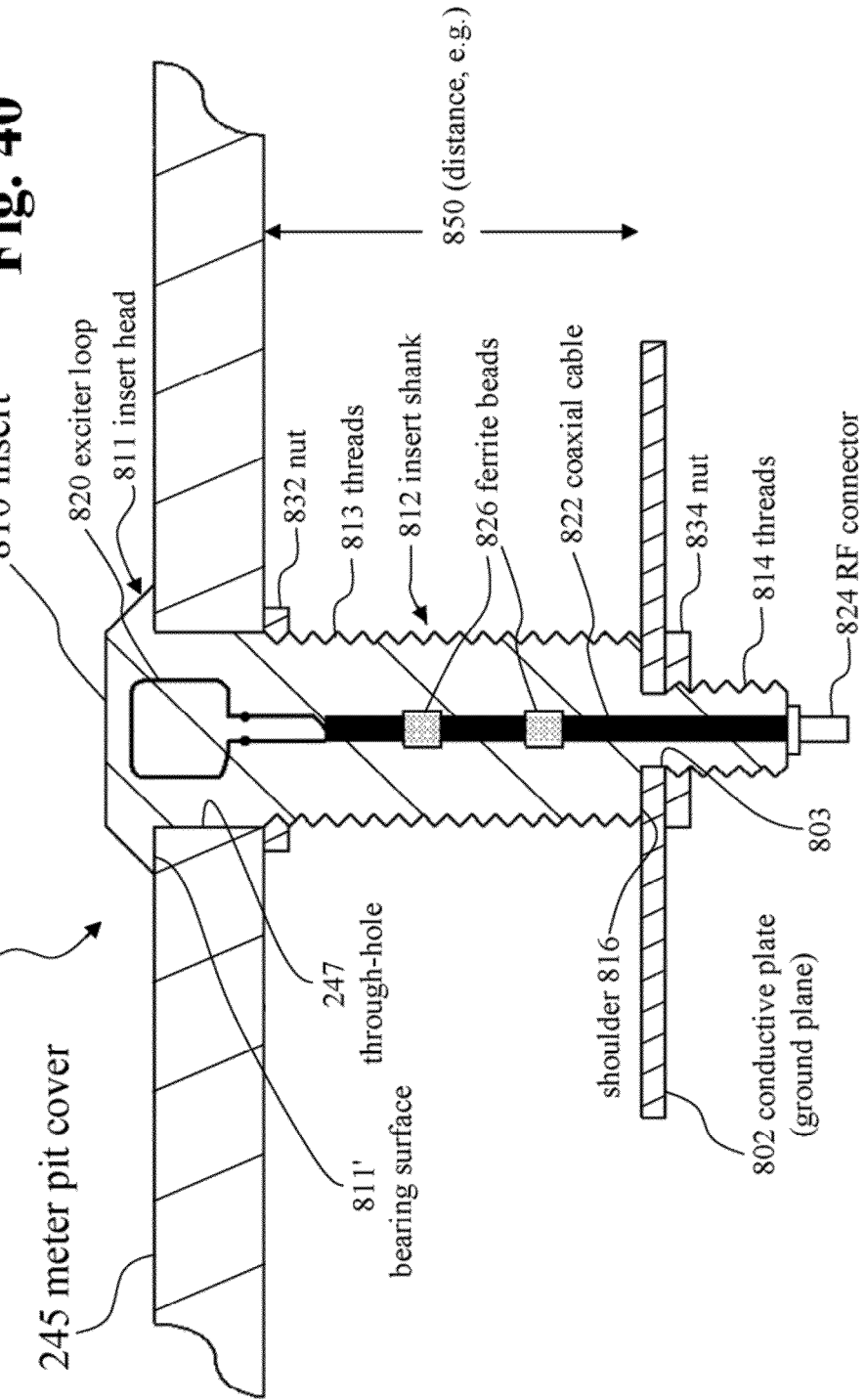
FIG. 40 is a diagram showing a cavity backed slot antenna in accordance with one embodiment of the invention.

FIG. 40 is a diagram showing a further embodiment of a cavity backed slot antenna in accordance with one embodiment of the invention. More specifically, FIG. 40 shows cavity backed slot antenna 800 (antenna 800), in accordance with one embodiment of the invention. Illustratively, the antenna 800 shown in FIG. 40 may be used in lieu of the antenna 320 shown in FIG. 3.

The antenna 800, as shown in FIG. 40, is disposed in a meter pit cover 245, and more specifically, the antenna 800 is disposed in a through-hole 247 of the meter pit cover 245. The through-hole 247 might be provided in the meter pit cover 245 in initial manufacture of the meter pit cover 245. Alternatively, an existing meter pit cover may be drilled, i.e. bored, to include the through-hole 247. Accordingly, an existing meter pit cover may be retrofit to provide for the antenna 800 of FIG. 40.

The antenna 800 includes an insert 810. The insert 810 may be resin, plastic, or some other suitable material. The insert 810 may be generally cylindrical shaped, with an insert head 811 and an insert shank 812. An exciter loop 820 is disposed within the insert head 811 and within the insert shank 812 as shown in FIG. 40. The particular dimensions and composition of the exciter loop 820 may be varied as desired. In particular, the dimensions and composition of the exciter loop 820 may be varied dependent on the particular frequencies of the communications intended to be transmitted and received and/or dependent on other parameters. As shown in FIG. 40, the exciter loop 820 is connected to a coaxial cable 822. The coaxial cable 822 is also embedded within the insert 810. In one embodiment, the exciter loop 820 may be embedded in the center of the insert 810. Relatedly, the connected coaxial cable 822 may also be embedded—and be disposed along the axial center of the insert shank 812, and extend between the exciter loop 820 and the lower end (as shown in FIG. 40) of the insert shank 812. As shown in FIG. 40, an RF (radio frequency) connector 824 is disposed on a distal end of the coaxial cable 822. The RF connector 824 serves to connect the antenna 800 with a water meter, i.e., in the manner that the antenna 320 is connected to water meter 250 as shown in FIG. 3. However, the antenna 800 is not limited to such use, and of course may be used in conjunction with other electronic components, instead of a water meter As described further below, the antenna 800 also includes a conductive plate 802, shown in cross section in FIG. 4. The conductive plate 802 is attached to the insert 810 and positioned below the meter pit cover 245, in such manner as to create the antenna cavity slot. For example, the conductive plate 802 might be positioned approximately 4 inches below the meter pit cover 245. The conductive plate 802, shown in cross section in FIG. 40, may be an annular disc constructed of metal or other suitable material, and including conductive plate central aperture 803. Accordingly, the conductive plate 802 might be in the form of a flat, circular plate with through-hole (so as to slide onto and be positioned on the threaded portion 814 of insert 810). More specifically, the threaded portion 814 (of insert 810) is received within the conductive plate central aperture 803.

As described above, the conductive plate 802 might be in the form of a flat, circular plate with through-hole. However, other shapes might be utilized (e.g. a flat, square plate with through-hole) as desired. The particular shape might be dependent on the intended transmissions, the particular environment the antenna is used in, and/or other parameters. FIG. 44 is a top view of the flat, circular conductive plate 802 (of FIG. 40) with conductive plate central aperture 803, in accordance with one embodiment of the invention.

As shown in FIG. 40, a plurality of ferrite beads 826 may be disposed on the coaxial cable 822. That is, for example, each of the ferrite beads 826 may be in the form of a small cylinder of suitable material that is slid onto the coaxial cable 822 prior to the exciter loop 820, coaxial cable 822, and ferrite beads 826 being embedded within the insert 810. The ferrite beads 826 prevent signals from flowing on the exterior of the coaxial cable 822, thus providing a balun for the antenna. This will maintain the performance and radiation pattern of the antenna. It is of course appreciated that the ferrite bead(s) 826 may alternatively be constructed of some other suitable material—so as to enhance the quality of the signals passing through the coaxial cable 822.

As described above, the ferrite beads 826 may be in the form of a cylinder of suitable material that is slid onto the coaxial cable 822 prior to the exciter loop 820, coaxial cable 822, and ferrite beads 826 being embedded within the insert 810. Relatedly, in one embodiment, insert 810 may be constructed using a molding process. That is, each of the coaxial cable 822, the exciter loop 820, the ferrite beads 826, may be disposed within a suitable mold. Thereafter, plastic or resin, for example, is injected into the mold so as to encapsulate the coaxial cable 822, the exciter loop 820, the ferrite beads 826.

As shown in FIG. 40, the insert head 811 is larger than the insert shank 812, such that an outer portion of the insert head 811 includes a bearing surface 811'. The insert shank 812 extends through the through-hole 247 of the meter pit cover 245. As shown in FIG. 40, the bearing surface 811' is disposed upon the top of the meter pit cover 245. The insert head 811 in conjunction with a nut 832 (disposed on insert shank 812) serves to hold the insert 810 in position relative to the meter pit cover 245.

More specifically, the insert 810 includes an insert shank 812 that is generally in the shape of a cylinder. The insert shank 812 includes a first cylindrical portion including threads 813. The insert shank 812 also includes a second cylindrical portion including threads 814. As shown in FIG. 40, an outer diameter (OD) of the threads 814 may be smaller than the outer diameter (OD) of the threads 813. After the through-hole 247 is bored, i.e. drilled, through the meter pit cover 245, the insert 810 is pushed into the through-hole 247 until the insert head 811 abuts against the top of meter pit cover 245. Then, as shown in FIG. 40, the nut 832 is screwed onto the threads 813 until the nut 832 abuts against the lower side of the meter pit cover 245. Accordingly, the meter pit cover 245 is essentially sandwiched between the insert head 811 and the nut 832. Thereafter, the conductive plate 802 is positioned, i.e. slid onto, the smaller diameter portion of the insert 810 past the threads 814. Thereafter, a further nut 834 is screwed onto the insert shank 812. In such manner, the conductive plate 802 is fixedly attached to the insert shank 812, i.e., the conductive plate 802 sandwiched between a shoulder 816 of the insert shank 812 and the nut 834. The nuts 832, 834 may be plastic, in accordance with one embodiment of the invention.

In a further embodiment, it is appreciated that (rather than sandwiching the conductive plate 802 between the shoulder 816 and the nut 834) the conductive plate 802 might be sandwiched between a pair of nuts 834 disposed on the threads 814. With such arrangement, it is appreciated that the nuts 834 (with conductive plate 802 sandwiched therebetween) might be positioned anywhere along the axle length that the threads 814 extend along the insert shank 812. Such arrangement would of course provide the capability to adjust the particular position of the conductive plate 802 vis-à-vis the meter pit cover 245 (i.e. the distance 850 as shown in FIG. 40) and not be dependent on the fixed position of the shoulder 816. Relatedly, it is appreciated that the distance 850 that the conductive plate 802 is spaced from the meter pit cover 245 may be wavelength dependent. In one embodiment, it has been found that a distance of 4 inches (distance 850 that the conductive plate 802 is spaced from the meter pit cover 245) was conducive to a 902 to 928 MHz frequency band, with an 8 inch diameter conductive plate 802; and with a 2 inch through-hole 247.

In general, it is appreciated that the particular dimensions of the antenna 800 and the various components of the antenna 800 (including the exciter loop 820, the insert shank 812, and the conductive plate 802, for example) may be varied as desired. For example, the particular dimensions of the antenna 800 might be varied depending on the particular frequency that the antenna 800 is designed to operate at, the particular environment in which the antenna 800 will operate, as well as other parameters.

In accordance with embodiments, it is appreciated that the antenna 800 may well be used in conjunction with other antennas. For example, the antenna 800 may be used in conjunction with another antenna or antennas to enhance performance or to enhance the variability of the viable transmission frequencies, for example. For example, the antenna 800 may be used in conjunction with the antenna 320 shown in FIG. 3.

Antenna 800 represents an embodiment of an antenna design that does not require and electrical connection between the meter pit cover 245 and RF connector 824. This offers significant advantages in simplifying antenna installation and reducing performance degradations due to short and long term corrosion. In further embodiments it is appreciated that other implementations could be used to realize and antenna that did not require an electrical connection to the meter pit cover 245.

Hereinafter, various further aspects of shut-off processing and related features will be described. In various embodiments, a separate manual shut-off valve 116 may be placed or left in the meter pit 240 to permit manual shut off of the water supply using conventional techniques. Alternatively, and/or in combination therewith, an electronically controllable shut off valve may be incorporated into the water chamber 260, or attached pipe, 215, thereby permitting remote water shut off, as will be discussed in greater detail herein. This electronically controllable shut off valve may comprise a spring loaded valve. In various embodiments, this valve may be manually tensioned into an open position with an external switch or valve control. A solenoid may be used to release the shut off valve based on a remote command received by the control module 300 of the meter system 250. More specifically, a solenoid, motor or other device may be used to open or close a shut off valve based on a remote command received by the control module 300 of the meter system 250. In accordance with some embodiments of the invention, shut off may require the water service provider to send a technician or other person out to the customer premises to return the shut off valve to the pre-tensioned, open position, such as, for example, after the consumer's water service account has been made current.

In the water meter, 250, according to FIG. 3, water flowing through the water chamber 260 may be counted by the water counting module 270 using a nutating valve assembly or other water volume measuring device that passes a known volume of water with each complete rotation, as is discussed in greater detail in the context of FIGS. 8 and 9. It should be appreciated that the various embodiments of the invention are not reliant on the particular type of water volume measuring device that is utilized. Several such mechanical devices are known in the art.

Figure 4:
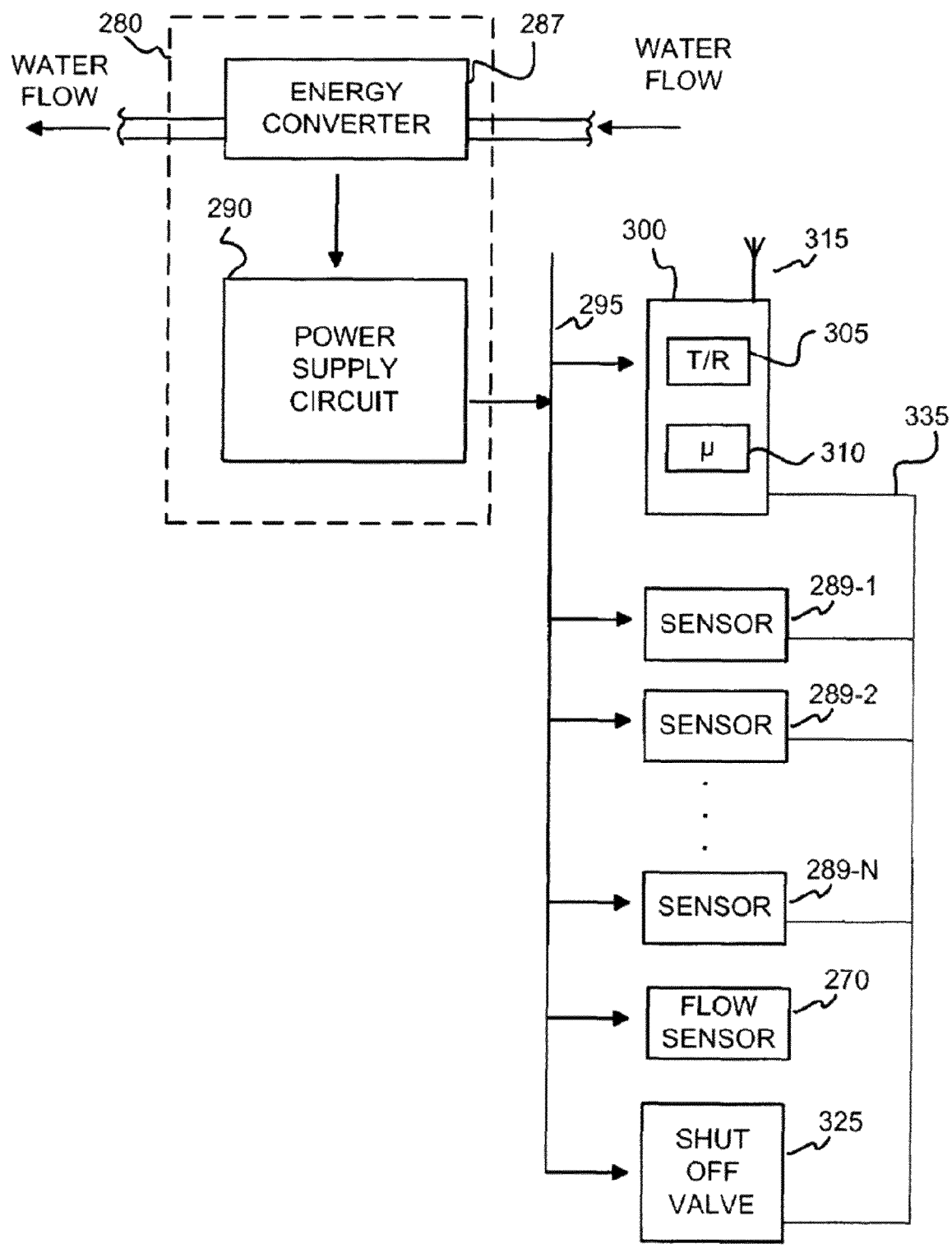
FIG. 4 is a block circuit diagram of electrical components of a remote water meter monitoring system according to various embodiments of the invention.
Figure 5:
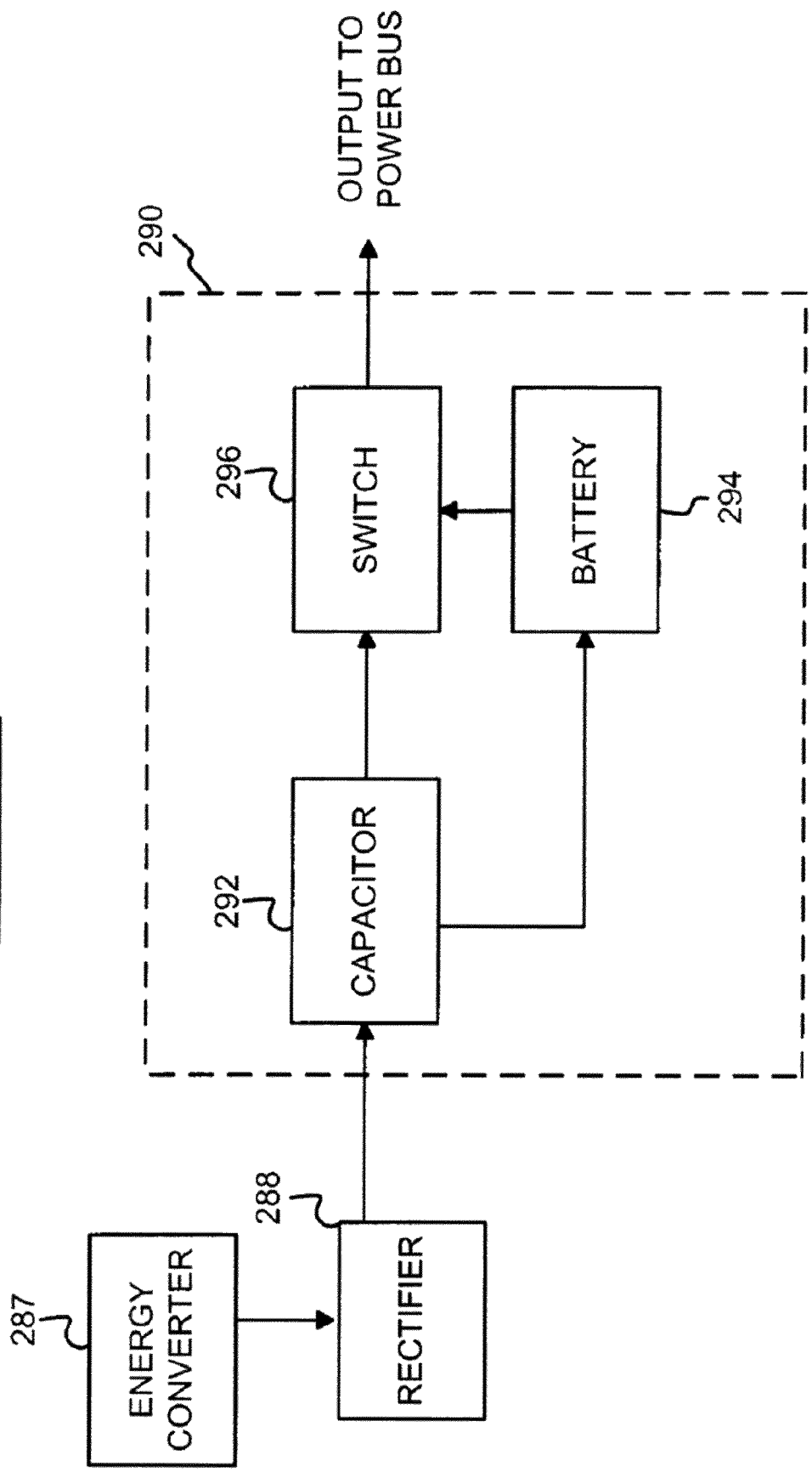
FIG. 5 is a block diagram of the power conversion circuit for a remote water meter monitoring system according to various embodiments of the invention.
Figure 6:
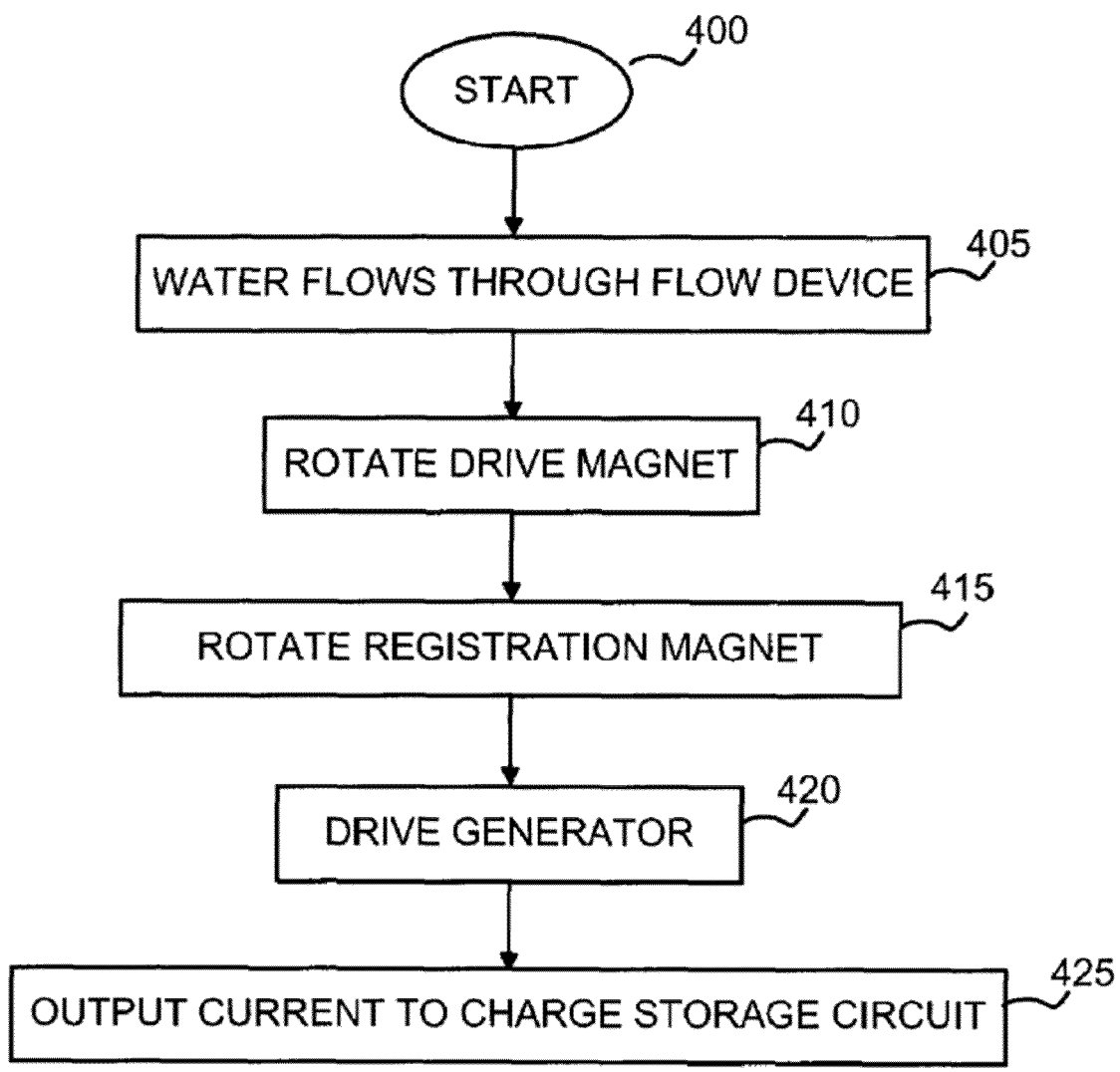
FIG. 6 is a flow chart of a method of converting mechanical water flow energy into electrical energy in a remote water meter monitoring system according to various embodiments of the invention.

Also, in the water meter 250, mechanical energy of the pressurized water passing through the water chamber 260, may be harnessed by the power conversion module 280 to provide electrical power for all the meter system components in the measurement head 265, as is discussed in greater detail in the context of FIGS. 4-6.

Referring now to FIG. 4, this figure is a block circuit diagram of electrical components of a remote water meter monitoring system according to various embodiments of the invention. The electrical components include a power conversion module 280. The power conversion module 280 includes a mechanical energy converter 287 located in the water chamber 260. The energy converter 287 may include an impellor, nutating disk, blade assembly or other surface area device rotating about a drive shaft to which torque is imparted by the flow of water. This rotating shaft may be used to energize one or more components in a power converter and supply module 290. The power converter and supply 290 may include one or more capacitors, one or more batteries, and control logic and/or switches for supplying system power to various components of the remote water meter monitoring system according to the various embodiments of the invention.

The power converter and supply 290 may output power to a power bus 295. The power bus 295 may supply power to the control module 300 as well as one or more sensors 289-1, 289-2. The power bus 295 may also supply power to a solenoid, motor or other actuator of an electronic shut off valve 325.

The control module 300 may include a transmitter and receiver (transceiver) 305, a microprocessor 310 and one or more memory structures (not shown) storing a control program executed by the control module 300 as well as historical data from the water counting module 270 and sensors 289-1, 289-2, . . . , 289-N. The sensors 289-1, 289-2, . . . , 289-N, may comprise water pressure sensors, temperature sensors, water quality sensors, or other sensors. Alternatively, or in combination, the sensors 289-1, 289-2, . . . , 289-N may be incorporated into a single sensor module, such as a board or chip-based sensor lab that performs a variety of diagnostic tests on the water. The sensor information may be communicated periodically or in real time to the control module 300 via communication bus 335, such as universal asynchronous receiver/transmitter (UART), serial peripheral interface (SPI) bus, inter-integrated circuit (I$^2$C), 1-Wire or USB. Also, the control module 300 may poll the one or more sensors 289-1, 289-2, . . . , 289-N periodically or on demand to obtain information corresponding to water conditions, current or past. The water counting module 270 may be electrically coupled to the power bus 295 and communicatively coupled to the control module 300 via the data bus 335.

Referring now to FIG. 5, this Figure is a block diagram of a power conversion circuit of a power conversion module for a remote water meter monitoring system according to various embodiments of the invention. As discussed briefly in the context of FIG. 4, the power conversion circuit may include an energy converter 287 driven by an mechanical energy of water flow. The energy converter 287 may convert the mechanical energy of the rotating shaft into electrical energy as discussed in greater detail in the context of FIGS. 6 and 7. After conversion by rectifier 288, the electrical energy generated by the energy converter 287 may charge a capacitor 292 of the power converter and storage module 290, which may in turn charge a battery 294. A switch 296 may select either the capacitor 292 or the battery 294 to supply output power, such as to the power supply bus 295 shown in FIG. 4. In various embodiments, the switch 296 may include decision logic for selecting either the capacitor 292 or the battery 294 based on a current state of either or both devices, or in accordance with a predetermine power management scheme stored in a memory device of the switch 296 or another memory structure external to the switch 296. In various embodiments, by placing the capacitor 292 between the energy converter 287 and the battery 294, the number of charge cycles of the battery 294 may be significantly reduced over direct charging techniques, thereby increasing the effective life of the system. Also, the switch 296 may help to insure that the battery 294 is charged by the capacitor 292 only after the battery 294 has been fully discharged to avoid battery memory problems and increase the usable life of the battery 294.

FIG. 6 is a flow chart of a method of converting mechanical water flow energy into electrical energy in a remote water meter monitoring system according to various embodiments of the invention. The method begins in block 400 and proceeds to block 405 where water flowing through the meter's water chamber rotates a turbine, impeller, blade and shaft assembly, or other mechanism that rotates with the flow of water, or causes a nutating disk assembly or other volume measuring assembly to be actuated. The mechanical energy created in block 405, in the form of the shaft rotation, is used to drive a drive magnet, in block 410. In block 415, the rotation of the drive magnet creates a time varying magnetic flux density that drives a registration magnet, which, in various embodiments, may be located above the portion of the meter assembly through which water is flowing. In block 420, the rotation of the registration magnet may drive the generator, either directly, such as via a drive shaft, or indirectly, through a mechanical gear assembly. In various embodiments, this may comprise spinning a pair of magnetically coupled rotors around a set of coils as discussed in the context of FIGS. 7A and 7B. The time changing magnetic flux caused by the rotation of the magnetically coupled rotors induces a time varying current in the coils generating an electrical current. In block 425, the current created in block 420 is output to a charge storage circuit. In various embodiments, this may comprise communicating the current to the input of a rectifier circuit that converts alternating current (AC) to direct current (DC) that can be used to create a stored charge in the capacitor. This stored charge can be used to provide line power to the remote meter monitoring system. This stored charge can also be used to charge the battery of the power conversion module.

Figure 7A:
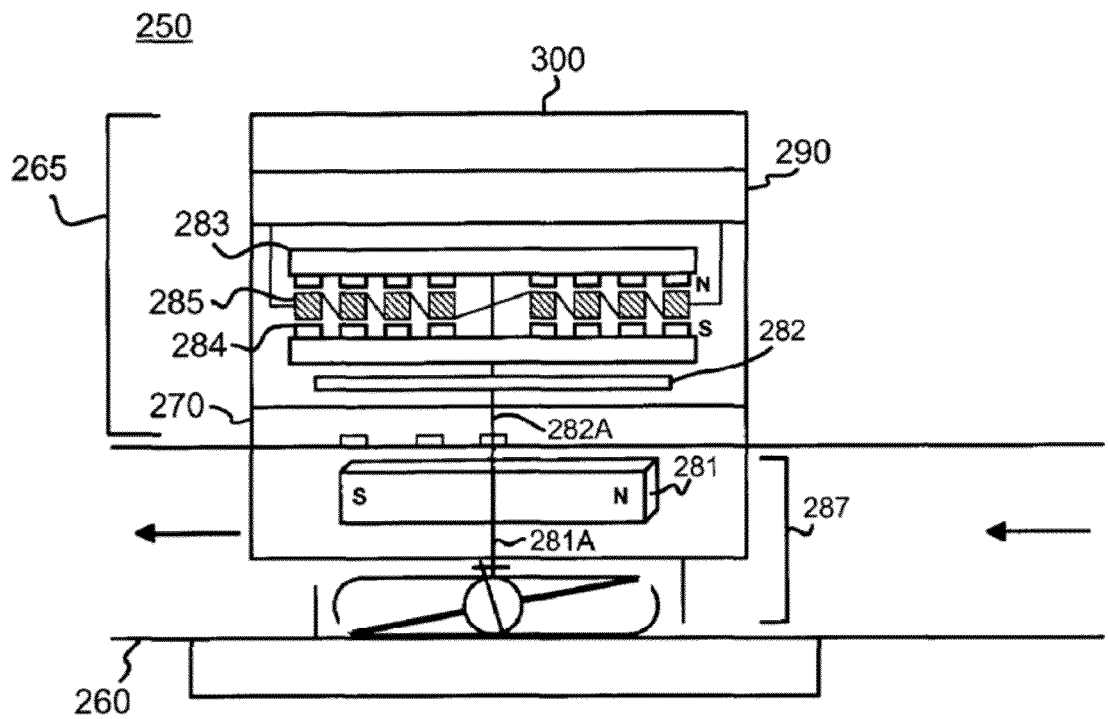
FIGS. 7A and 7B are different views of a water measurement head including a power conversion generator for a remote water meter monitoring system according to various embodiments of the invention.
Figure 7B:
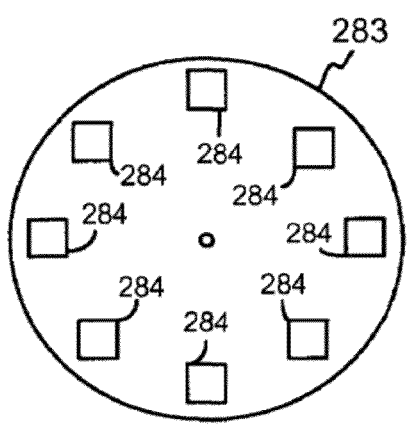

FIGS. 7A and 7B are different views of a water meter, including a power conversion generator for a remote water meter monitoring system according to various embodiments of the invention. FIG. 7A shows a cut-away view of the water meter system 250, including the energy converter 287. Water enters the water chamber 260 in the direction indicated by the arrow 115A. The force of this water contacts the energy converter 287, which, in this example, includes a nutating disk assembly. It should be appreciated that another water volume measuring device may be utilized to measure the flow rate. In the exemplary embodiment depicted in FIG. 7A, the nutating disk's motion drives a drive magnet 281 via a drive shaft 281A in the water chamber 260. In addition to providing a magnetic flux change detectable by the water counting module 270, the drive magnet 281 drives a registration magnet 282, located in the measurement head 265, via magnetic conduction. The registration magnet 282 rotates about an is 282A, which also controls the rotation of the rotor elements 283 of the power conversion module 280. The power conversion module 280, also referred to herein as an generator, may comprise a pair of magnetically coupled rotors 283 that face each other having magnetic plates 284 affixed thereto, the rotation of which is driven by the registration magnet, either directly, or via a mechanical gear assembly.

In various embodiments, such as is shown in the context of FIG. 7B, each rotor 283 may have a number of magnets, or magnetic plates 284 affixed thereto. For illustration purposes only, eight magnets are shown in FIG. 7B. However, it should be appreciated that more or fewer magnets maybe used with the various embodiments of the invention. Also, a magnetic disk with one or more magnetic pole pairs may be utilized instead of the rotor 283 shown in FIG. 7B, without departing from the spirit or scope of the invention. In fact, the various embodiments of the invention are not tied to any particular rotor design. In the example of FIGS. 7A and 7B, the magnets 284 are coupled to one another with North-South poles facing each on the respective upper and lower rotors 283. Between the rotors 283 is a set of fixed conductive coils 285. In various embodiments a number of multi-turn coils may be suspended between the magnetically coupled rotors. Also, the coils 285 may be oriented so that when the rotors 283 rotate, the direction of the magnetic field passes through the center is of each coil, thereby inducing a maximum current in each coil 285. However, it should be appreciated that other orientations may be utilized as well. Furthermore, the number of coils that may be utilized is not critical to the various embodiments of the invention.

With continued reference to FIG. 7A, as the water flow drives the rotation device, this in turn rotates the drive shaft 281A. Rotation of the drive shaft causes the drive magnet 281 to rotate, either directly, or indirectly, through a gear assembly. Rotation of the drive magnet 281, in turn, may cause a registration magnet 282 to rotate via magnetic conduction. The registration magnet may rotate about its own shaft 282A. Rotation of the shaft 282A may cause a pair of magnetically coupled rotors 283 to rotate, thereby inducing a current in a series of coils 285 suspended between the facing rotors 283. This current may have a generally sinusoidal magnitude over time due to the changing pattern of magnetic flux density over the rotors' 283 rotation. The outputs of the coils 285 are supplied to the input of the power conversion and supply module 290. For example, the output of the coils 285 may be rectified and used to charge a capacitor such as the capacitor 292 in FIG. 5.

Figure 8A:
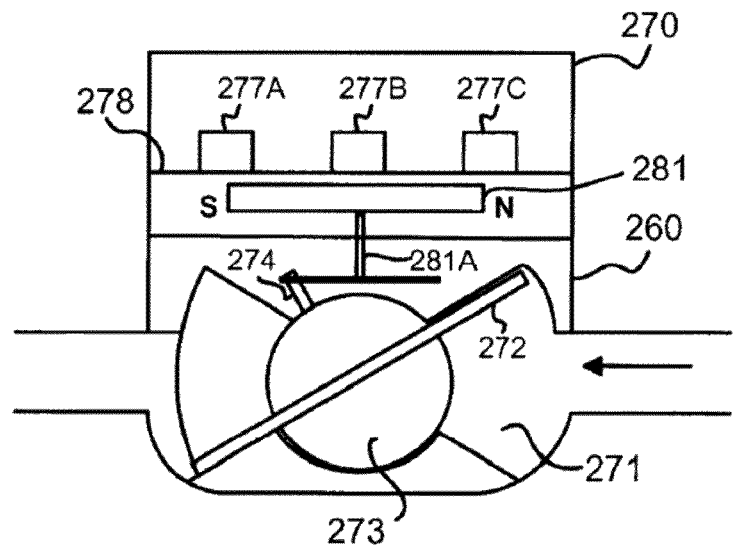
FIGS. 8A and 8B are different views of a water chamber and water measurement head including a water counting system for a remote water meter monitoring system according to various embodiments of the invention.
Figure 8B:
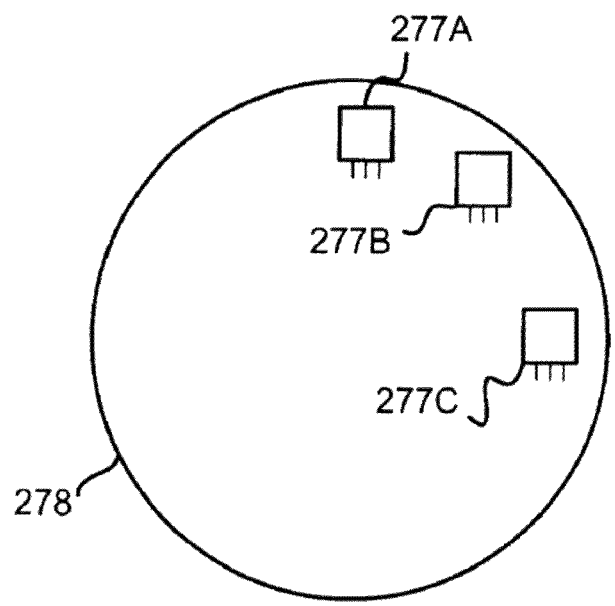

Referring now to FIGS. 8A and 8B, these Figures are different views of a water chamber and water measurement head including a water counting system for a remote water meter monitoring system according to various embodiments of the invention. The water counting module 270 is comprised of a water counting mechanism. The water counting mechanism is configured to quantify motion of a volumetric element to a specified volume of water. This in turn can be used to determine water consumption through the meter. One example of such a volumetric element is a nutating disk based system, such as that depicted in FIG. 8A. It should be appreciated that other mechanical volume meters may be used without departing from the spirit or scope of the invention. In the example of FIG. 8A, water entering the water chamber 260 passes through a disk chamber 271. A nutating disk 272 wobbles about a ball and cradle type joint 273 having a center is 274. The movement of the center is 274 causes a shaft 281A to drive a magnet 281. Thus, each rotation of the magnet 281 may be correlated mathematically to the passage of a discrete and known volume of water. A plurality of magnetic flux detectors 277A, 277B, 277C, such as a Hall effect sensors or other sensors, attached to the cover 278 may be used to "count" the number of rotations of the drive magnet 281. Using a known conversion parameter, these counts may be used to determine flow rate and therefore water consumption.

In the exemplary system shown in FIG. 8, three sensors 277A, 277B, and 277C are used. In: various embodiments, a first sensor 277A may be used to selectively wake up a controller in the control module 300 from a sleep or low power state. For example, the CPU of the control module may default to a sleep state to reduce power consumption. When the first sensor 277A senses a magnetic flux change caused by rotation of the drive magnet 281, it may send a signal to wake up the processor of the control module via an interrupt pin on the CPU, causing the CPU to prepare to begin recording water consumption.

The second sensor 277E may be used to count the number of rotations of the magnet that occur. A parameter may be stored in advance in the controller or elsewhere correlating the number of rotations per gallon of water flow. Thus, in various embodiments, each count by the sensor 277B sends a signal to the control module. Every N of these signals may cause the microprocessor to increment a water usage variable stored in memory to reflect the increased water consumption.

In various embodiments, a third sensor 277C may be incorporated to permit the system to detect a backflow condition, that is, water flowing into the supply pipe from a customer premises. This may be indicative of incorrectly connected plumbing lines within the premises, an attempt to introduce contaminants into the water supply, or even a break in the water supply line. By positioning the third sensor 277C within a predetermined number of radians with respect to the second sensor 277B, such as, for example, between pi./4 and pi./2 radians, it may be possible to determine the direction of water flow through the chamber 271. This may be done by comparing the measured north-south pole transitions from the second sensor 277B and the third sensor 277C for a given time period. The pattern will be different in the case of reverse motion of the magnet causing the control module to determine that back flow is occurring. The control module may increment a different counter to record backflow. Also, backflow in excess of a predetermined amount may cause a shut off valve to be automatically engaged and/or a signal to be sent to the bridge device notifying the water supplier of the existence of the backflow condition.

It should be appreciated that the particular type of water counting mechanism is not critical to the various embodiments of the invention. Various different sensor types may be used in conjunction with mechanical flow control devices such as a nutating disk to count the volume of water flowing through the water chamber 260, with a general goal of reducing and minimizing current drawn by the sensors.

Referring now to FIG. 9, this Figure is a flow chart of a method for measuring water flow with a remote water meter monitoring system according to various embodiments of the invention. The method begins in block 500 and proceeds to block 505 where water flows into the water flow chamber of the water meter. Generally, such flows are driven by a release of water in a customer premises such as by turning on a faucet.

In block 510, the water flowing into the water flow chamber must pass through a rotating, nutating, or oscillating disk or other flow measuring mechanism, or flow meter, causing a shaft to rotate in accordance with a cycle of the disk. As discussed above in the context of FIG. 8A, in one nutation cycle a known volume of water has flowed through the water meter. Next, in block 515, the rotation of the nutation disk, or other flow sensor causes a drive shaft to turn which in turn causes a drive magnet to rotate due to mechanical coupling of the flow sensor to the drive magnet.

The rotation of the drive magnet generates a time changing magnetic field, that is, a change in flux density over time. In block 520, a sensor, such as a Hall effect sensor, or other flux change sensor, detects this changing flux density caused by the drive magnet's rotation. In various embodiments a non-magnetic material will be used for the water chamber to enable the flux change to be detected through the sealed water chamber. In block 525, the sensor sends a wake-up signal to a control module to "wake up" and begin recording water flow. In block 530, another sensor counts the magnetic pole changes caused by the rotating magnet and sends a count signal to the control module. In block 535, based on a look-up value corresponding to the parameters of the meter, the control module calculates a flow rate based on the number of mutation cycles. In block 540, a water usage variable is incremented for each unit of flow, such as, for example, for each gallon.

Figure 10:
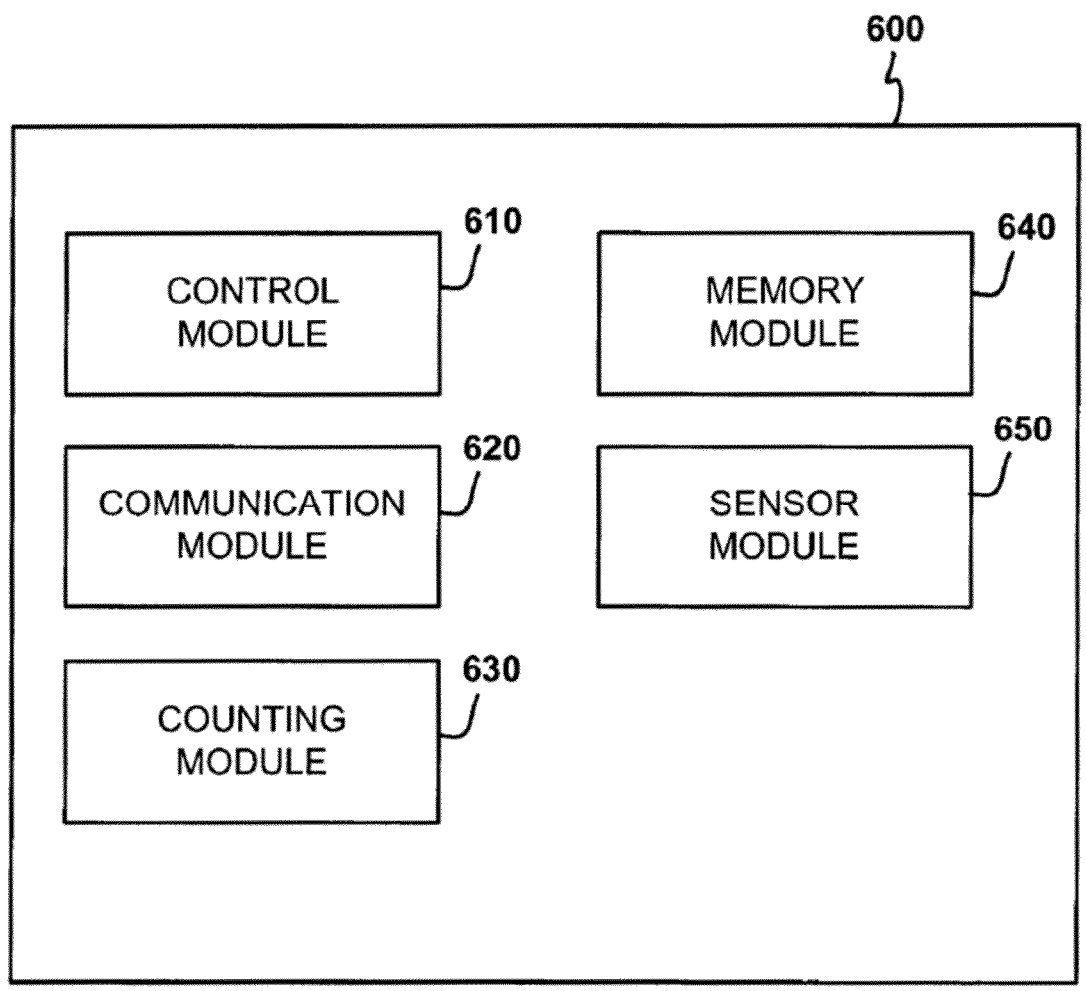
FIG. 10 is a block diagram illustrating the various logic modules utilized in the remote water meter monitoring system according to the various embodiments of the invention.

Referring now to FIG. 10, this Figure is a block diagram illustrating the various logic modules utilized in the remote water meter monitoring system according to the various embodiments of the invention. The system 600 comprises various modules which may provide functionality for facilitating rewards-based investments over a communication network, as well as to provide other functionality.

In the example of FIG. 10, a control module 610, a communication module 620, a water flow module 630, a sensor module 640 and a memory module 650 are shown. It should be appreciated that each module 610, 620, 630, 640, and 650 may be configured as a software application executing on computer hardware, an application specific integrated circuit (ASIC), a combination of hardware and software, combinations of these, or other suitable configuration. In commercially available mesh network nodes, single package solutions are available that includes a programmable microprocessor and a radio transceiver based on one or more communications protocols, such as, but not limited to, for example, the IEEE 802.15.4 standard for wireless personal area networks (WPANs). It should also be appreciated that one or more of modules 610, 620, 630, 640, and 650 may be combined or broken into multiple additional modules. Furthermore, modules different than the exemplary ones depicted in FIG. 10 may be used with the various embodiments of the invention.

As described above, in accordance with one embodiment of the invention, Internet Protocol version 6 (IPv6) may be utilized. IPv6 is a version of the Internet protocol (IP). As is well known, the Internet and related protocols operate by routing packets of data across networks. Each of the packets may be independently routed. In particular, the data contained in each data packet contains an address of the data packet's originating device, as well as an address of the data packet's destination device. IPv6 provides various advantages over prior versions of IP including increased address availability and simplified address assignment, for example.

The communication protocols, utilized by some of the solutions described herein may well, and typically do, use proprietary protocols. However, in accordance with further embodiments of the invention, IP (and specifically IPv6) may be used in lieu of such proprietary protocols. As a result, a wide variety of off-the-shelf applications including web applications and other resources/tools may be utilized (which were not compatible with the proprietary protocols, but which are compatible with the widely used IPv6). Relatedly, the use of IP avoids reliance on a particular vendor that provided the particular proprietary communication protocol.

More specifically, in accordance with one embodiment, the water meter described herein may be IP enabled, i.e. specifically using IPv6. The use of an IP enabled meter allows a customer, possessing the correct password and other security credentials, to read their own meter using a suitable IP compatible device, which is readily available Each meter would be provided with its own IP address (in a similar manner as a personal computer is provided with its own IP address). Such use of IP is distinct from the proprietary technology commonly used today. Such use of IP protocol (and all the security aspects associated with such IP protocol) is advantageous in that all that is required to provide communication between the network supporting the meters vis-a-vis the outside world is a readily available bridge, which goes from the wireless network to the wireless world. That is, the bridge provides access between the wireless network (and the meters disposed in such wireless network) and the outside world. This enables a user (such as a water service provider) to utilize a wide variety of web applications and other tools that are available.

Accordingly, in accordance with one embodiment of the invention, in order to collect information from a particular meter, a request is sent to the particular IP address of the individual meter, i.e. since each meter has its own IP address. The request may be in the form of a packet requesting information such as water usage, backflow usage, water pressure, and temperature parameters, for example. The data sent from the meter (in response to the request) is typically relatively small. Thus, the needed bandwidth to effect such communication is minimal and very workable. For example, it may only be needed for the utility entity to "talk" to a particular meter ten (10) times per day, for example, while still effecting highly useful communication between the meter and the water service provider.

As described above, a user in the outside world (e.g. the water service provider or the customer) may send data packets directly to a particular meter. However, such IP communications may indeed not be direct, but rather utilize the mesh network as described herein. That is, one meter may essentially function as a router to relay communications from a particular meter to the user or vice-a-versa. Relatedly, such communications may be routed through a series of meters using the IP protocol. The energy harvesting as described herein, provides additional energy if needed to use IP.

With further reference to FIG. 10, the control module 610 may comprise an embedded microprocessor, DSP, or other processor, or even a real-time kernel of an embedded operating system. The control module 610 may be programmed with an instruction set tailored to the specific application of remote water meter monitoring. For example, the control module 610 may be programmed with a set of instructions that can be received remotely, as well as a set of manufacturer/integrator defined parameters, including a schedule of operator, e.g., uploading data every hour, as well as instructions to perform other processing. The control module may also include a system clock.

The communication module 620 may comprise a two-way radio (transceiver) configured to communicate using one or more wireless communications protocols. The communication protocol may also store mesh network selection algorithms for determining an optimal network path. This type of information is typically programmed by the manufacturer of the transceiver. The communication module 620 may permit two-way communication from the system 600 to/from a bridge device, either directly, or through one or more other such systems.

The counting module 630 may receive count signals from one or more sensors or detectors indicative of a water flow through the water flow chamber. The counting module 630 may convert these count signals, based on a stored value correlating the count signals to a particular volume of water, into a flow rate. This flow rate may then be used to increment a running total of water consumption in a particular billing unit, such as in gallons. The counting module 630 may store and increment this value in the memory module 640. The memory module may consist of a relatively small amount of non-volatile memory that is used to store water consumption information as well as information from other sensors and components. Such processing steps are also described above with reference to FIG. 9 and in particular steps 535 and 540 of FIG. 9.

The sensor module 650 may receive information from one or more transducers or other sensors that are capable of sending electrical signals corresponding to physical phenomena. The sensor module 650 may include a standard or non-standard data bus connected to sensor bus adapted to interface with one or more sensors. For example, a pressure sensor may sense ambient water pressure in the pressure chamber and convert this information to an electrical signal that is received by the sensor module 650. The sensor module 650 may poll the sensors to provide information periodically. Alternatively, the sensors may send the information to the sensor module 650 periodically. The sensor module 650 may store this sensor information in the memory module 640 so that it can be uploaded by the control module 610 via the communication module 620 in accordance with an upload schedule or on demand. The sensor module 650 may communicate with individual sensors, such as sensors, for pressure, temperature, water quality, etc. Alternatively, the sensor module 650 may communicate with an integrated sensor, such as a lab-on-a-chip or lab-on-a-board that is capable of performing a plurality of different water quality tests in real or near real time. The various embodiments disclosed herein may provide a remote water meter monitoring system that reduces costs and increases accuracy of water meter reading. Also, various embodiments may provide access to water meter information remotely via network-based interface such as any computing device executing a network browser, such as an Internet web browser, for example. Further, various embodiments may provide additional services such as remote water shut off, event-based messaging, back flow detection, and water quality monitoring. For example, the control module 610 may be programmed to upload a message when more than a predetermined amount of water has flowed through the meter, indicating a potential leak situation. This may cause a message to be sent to the water customer based on previously specified contact information. Additionally, the customer may be able to access his/her own account via a server system maintained by the water service provider in order to remotely monitor past and current water usage conditions at the customer's premises. Also, various embodiments may harness mechanical energy from water flowing through the meter to generate power. This power generation may eliminate the need for redundant power systems or line power. Furthermore, by using the capacitor as the primary power source and managing the charging cycles of the system batteries, may extend the life of the system, eliminate the need for battery replacement, and provide additional power for the other sensors discussed herein.

As described above with reference to FIG. 10, the control module 610 may be programmed with an instruction set tailored to the specific application of remote water meter monitoring. The instruction set may include, in particular, the additional services described above including remote water shut off, event-based messaging, back flow detection, water quality monitoring, and uploading a message when more than a pre-determined amount of water has flowed through the meter, indicating a potential leak situation, for example.

Figure 37:
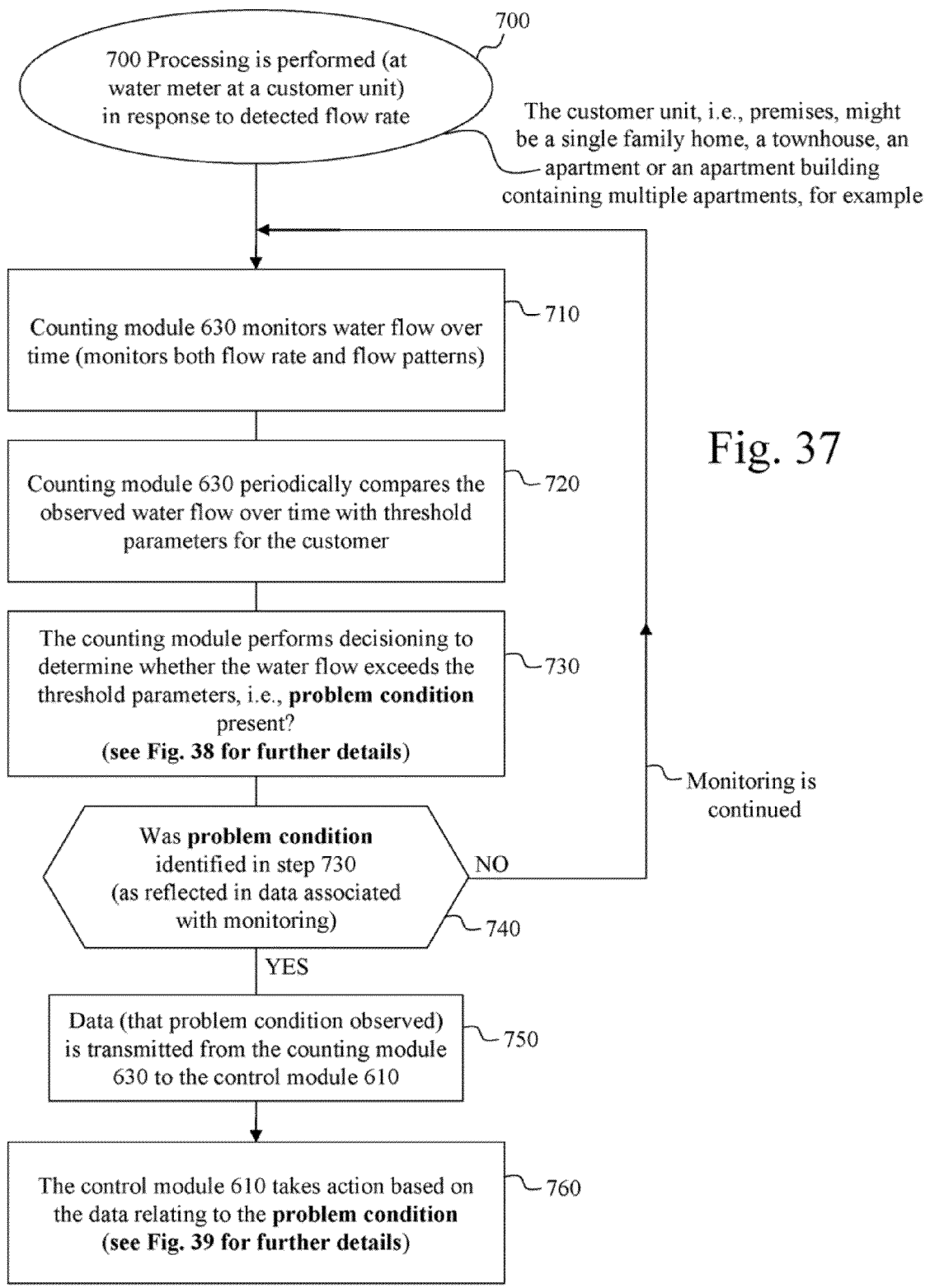
FIG. 37 is a flowchart showing further details of processing performed by an instruction set, which may be disposed in a water meter, in accordance with one embodiment of the invention.

FIG. 37 is a flowchart showing further details of processing performed by such an instruction set, which may be disposed in the counting module 630, in accordance with one embodiment of the invention. Specifically, FIG. 37 shows processing which may be performed by the counting module 630 using such an instruction set. Alternatively, it is appreciated that the processing of FIG. 37 (or a portion of the processing) may be performed by the control module 610 or some other processing unit, based on data received from the counting module 630.

As shown in FIG. 37, the process starts in step 700—which reflects that processing is performed in response to a detected flow of water. In this example, the processing is performed at a particular water meter at the customer's unit. The customer's unit, i.e. the customer's premises, might be a single family home, townhouse, an apartment, and apartment building, or any other premises to which water flow is controlled using a water meter of the invention.

After step 700, the process passes to step 710. In step 710, the counting module 630 monitors water flow over time. Such monitoring may include monitoring both flow rate and flow patterns, as well as other attributes of flow. Then, the process passes to step 720.

In step 720, the counting module periodically compares the observed water flow over time with threshold parameters for that particular customer. Accordingly, the threshold parameters may well vary from customer to customer. Such threshold parameters might be based on historical data, water usage parameters that are in place, or preferences set by the customer, for example. After step 720, the process passes to step 730.

In step 730, the counting module performs decisioning to determine whether the water flow exceeds the threshold parameters. In other words, the counting module determines whether or not a "problem condition" is present. Further details of the processing of step 730 are described below reference to the FIG. 38. After step 730, the process passes to step 740 of FIG. 37.

In step 740 of FIG. 37, the processing determines whether a problem condition was indeed identified in step 730. In accordance with this embodiment, such a problem condition is reflected in the data generated from the processing of step 730. In step 740, if there was not a problem condition identified, then the processing returns to step 710. In step 710, the monitoring will continue as described above.

On the other hand, if the problem was indeed identified in step 740, then the processing passes to step 750. In step 750, the data, indicative that a problem condition was indeed observed, is transmitted from the counting module 630 to the control module 610. Then, the process passes to step 760. In step 760, the control module 610 takes action based on the data relating to the problem condition. Further details of the processing of step 760 are described below with reference to FIG. 39.

Figure 38:
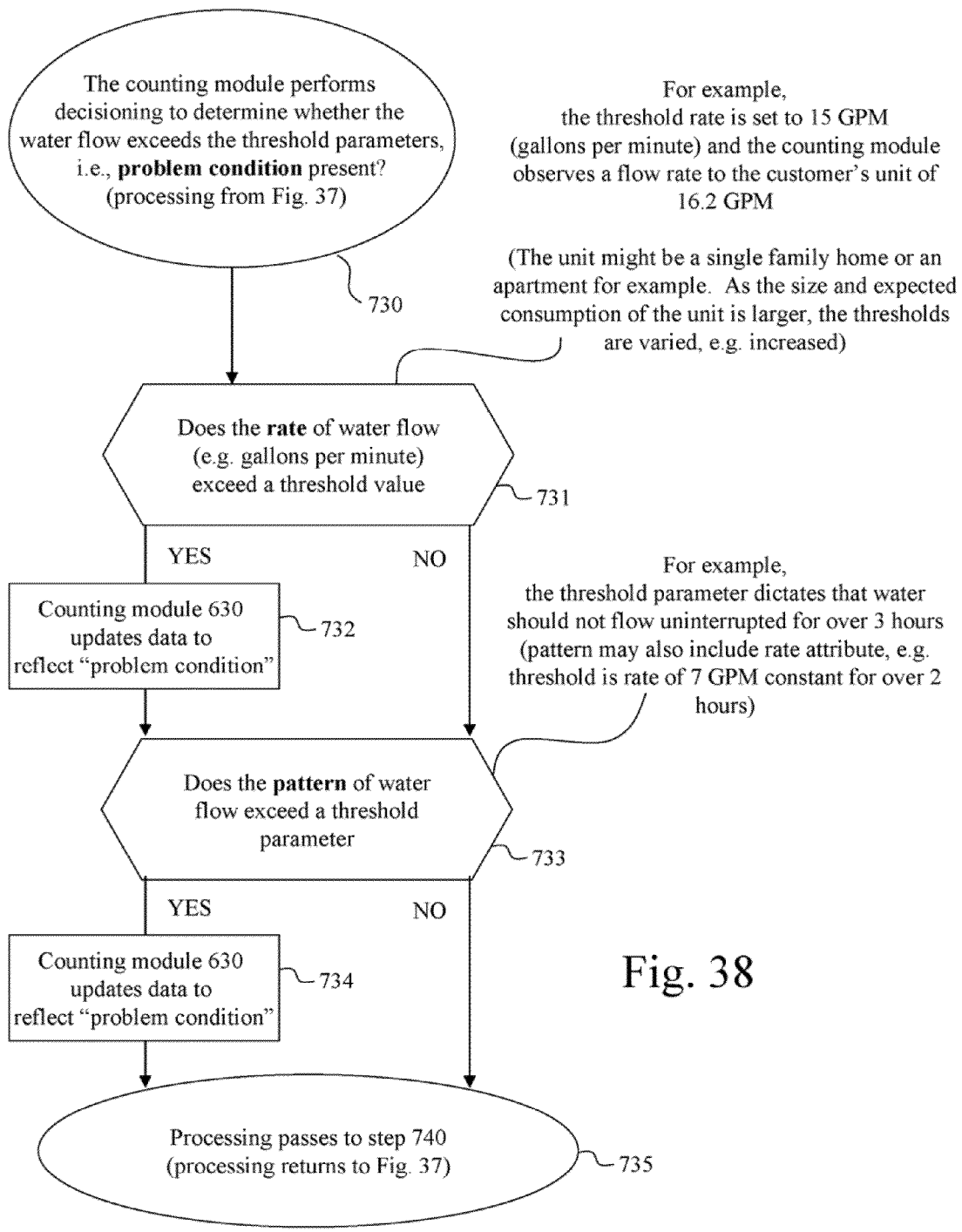
FIG. 38 is a flowchart showing in further detail the "counting module performs decisioning to determine whether the water flow exceeds the threshold parameters" step of FIG. 37, in accordance with one embodiment of the invention.

FIG. 38 is a flowchart showing in further detail the "counting module performs decisioning to determine whether the water flow exceeds the threshold parameters" step 730 of FIG. 37, in accordance with one embodiment of the invention. As shown, the process starts in step 730 and passes to step 731. In step 731, the counting module determines whether the rate of water flow exceeds a threshold value. For example, the rate of water flow might be measured in gallons per minute. If "yes," i.e. the rate of water flow does exceed the particular threshold value, then the processing passes to step 732. In step 732, the counting module 630 updates the data associated with the monitoring to reflect that there is a problem condition, i.e. that the water flow exceeded one or more thresholds. After step 732, the process passes to step 733.

Illustratively, with further reference to step 731, the threshold rate might be set to 15 GPM (gallons per minute). If the counting module observes a flow rate to the customer's unit of 16.2 GPM, then the counting module will identify a problem situation, i.e., since the threshold has been exceeded.

On the other hand, if the rate of water flow does not exceed the particular threshold value in step 731, and the process passes directly to step 733.

In step 733, the counting module determines whether the "pattern" of water flow exceeded a threshold parameter. For example, a threshold parameter (which the counting module compares the water flow against) may dictate that water flow should not flow uninterrupted for over 3 hours. It is further appreciated that the pattern decisioning may also include a rate attribute. For example, a threshold might be utilized dictating that a rate of 7 GPM constant for over two hours will trigger a problem condition.

In step 733, if the pattern of water flow did indeed exceed the particular threshold parameter, then the process passes to step 734. In step 734, the counting module 730 updates the data to reflect a problem condition. After step 734, the process passes to step 735. On the other hand, if "no" in step 733, then the process passes directly to step 735.

In step 735 of FIG. 38, the processing passes to step 740 of FIG. 37. Further processing is performed as described above.

Figure 39:
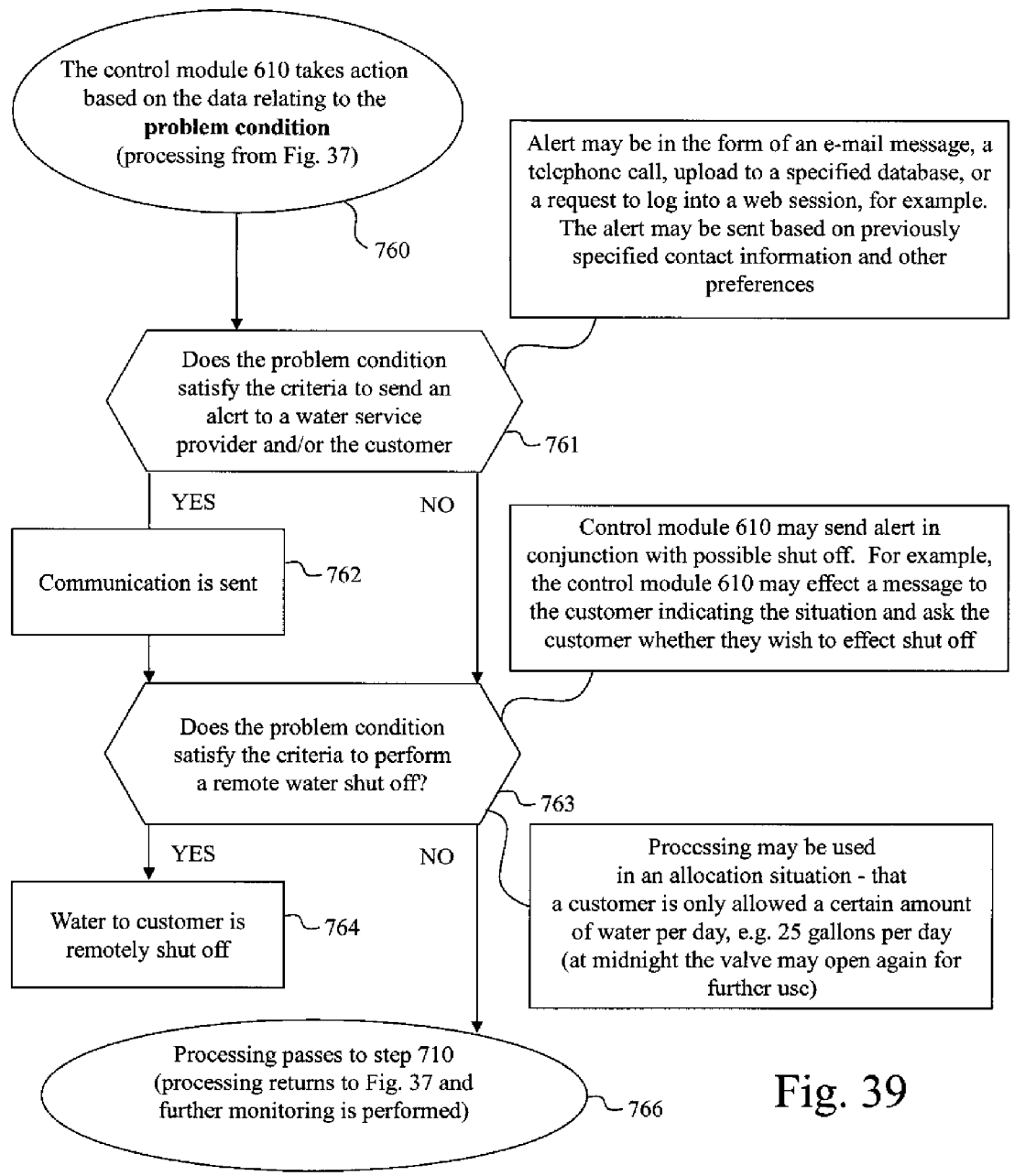
FIG. 39 is a flow chart showing in further detail the "control module takes action based on the data relating to the problem condition" step of FIG. 37 in accordance with one embodiment of the invention.

FIG. 39 is a flow chart showing in further detail the "control module 610 takes action based on the data relating to the problem condition" step 760 of FIG. 37 in accordance with one embodiment of the invention. As shown, the process starts in step 760 and passes to step 761. In step 761, the control module determines whether the problem condition satisfies the criteria to send an alert to the particular water service provider, such as a utility company, and/or to the customer. The alert may be in the form of an e-mail message, a telephone call, an upload it to a specified database or website, or a request for the particular user to log into the web session, for example. Any form of communication may be utilized as desired. The alert may be sent based on previously specified contact information or other preferences established by the customer, for example.

If in step 761 the problem condition does indeed satisfy the criteria to send an alert, then the process passes to step 762. In step 762, the control module 610 (working with the communication module 620) sends the communication (or communications) to the particular parties. After step 762, the process passes to step 763.

On the other hand, if "no" in step 761, i.e. the problem condition does not satisfy the criteria to send an alert, then the process passes directly to step 763.

In step 763, the control module 610 determines whether the problem condition satisfies the criteria to perform a remote water shut off. If "yes" in step 763, then the process passes to step 764. In step 764, water flow to the customer is remotely shut off, as described herein. On the other hand, if in step 763, the problem condition does not satisfy the criteria to perform a remote water shut off, then the process passes to step 766. In step 766, the processing passes to step 710 of FIG. 37. That is, further monitoring is performed as described above.

With further reference to step 763, it is appreciated that the control module 610 may send an alert in conjunction with possible shut off of the customer's water. For example, the control module 610 may effect a message to the customer indicating the particular situation that is being observed. Accordingly, the control module 610 may provide information to the customer—upon which the customer may decide whether they wish to shut off the water.

In accordance with a further aspect of the invention (with reference to in particular FIGS. 37 and 39), it is appreciated that the processing may be used in an allocation situation. For example, a customer (in a certain geographical area) may only be allowed a certain amount of water per day, such as 25 gallons per day, for example. Accordingly, if the customer exceeds their 25 gallons per day, then such will be observed as a problem condition. Based on some such observation, the control module 610 may be programmed to shut off the water for a certain amount of time. For example, the water flow may be turned back "on" upon the time reaching midnight. Relatedly, it is appreciated that the water meter, and in particular the control module 610, may be programmed (as described herein) to monitor water flow in any of a wide variety of manners and compare such water flow to any of a wide variety of parameters—in order to perform condition based action. Accordingly, particular threshold values in place, as well as particular responsive action (by the water meter in response to such threshold values being exceeded) may be changed by varying the attributes of the particular program, i.e. by varying the attributes of the implementing instruction set.

As described above, shut off processing (as controlled by the control module 610, shown in FIG. 10, for example) may be used in an allocation situation, such as when a customer in a certain geographical area is only allowed a certain amount of water per day. However, there are a wide variety of other situations in which shut off processing may be performed. In general, in such situations, the control module 610 (or other suitable control processor) is provided data to effect such shut off processing. More specifically, the control module 610, as otherwise described herein, is in communication with one or more server computer systems associated with the water service provider 110. The water service provider 110 (i.e., the computer system thereof) in combination with one or more control modules 610 perform "shut off processing" (as described herein), in accordance with embodiments of the invention.

In accordance with one embodiment, shut off processing may be performed in the context of the amount of funds available to pay for consumed water. For example, the price of water might be $5 per 1000 gallons of water. The customer's account, as maintained by the water service provider 110, may have funds available in the amount of $20 per month. Accordingly, data may be generated by the water service provider 110 and/or the control module 610 so as to allocate $20 of water to the customer per month, i.e., 4000 gallons. Once the 4000 gallons is consumed by the particular customer, the control module 610 turns off the water supply to the customer. Accordingly, water consumption may be controlled, i.e., shut off processing performed, based on various parameters as desired—such as gallons of water consumed or funds available to the customer (which in turn translates into a certain number of gallons). It is of course appreciated that the particular amount of water available based on given funds will vary as the price of water varies. Shut off processing may take into account such variance in some suitable manner.

Shut off processing may be controlled based on various other parameters. Shut off processing may be controlled based on the particular time of day, for example. For example, water may be controlled by the control module 610 so as to only be available to a customer during a particular time of day. For example, legal requirements may be in place such that in certain hours in a day water cannot be shut off. Also, water may be controlled by the control module 610 based on environmental conditions. Such environmental conditions might include a temperature at a particular point in time, average temperature over a period of time; the amount of rain received in a particular geographical area, and/or other environmental conditions.

Shut off processing may also be performed in the context of water contamination. For example, a control module 610 may input data, such as from the sensor module 650 for example, indicating that passing water is contaminated in some manner. The contamination might be some observed chemical that has exceeded a predetermined threshold, for example—such being indicative of a poison in the water. Accordingly, in this embodiment, the control module 610 detects the water quality, identifies that the water quality is not acceptable based on predetermined parameters, turns off the water that the control module 610 is controlling, and outputs data back to the water service provider 110. Further processing may include the water service provider 110 coordinating shut off processing in some predetermined manner. For example, all systems 600 (see FIG. 10) in geographical proximity to the particular system 600 (in which is disposed the control module 610 (which observed the deficiency in water quality)) might be sent instructions to turn off water. Accordingly, shut off processing in the context of water contamination may be very simplistic (as in the example above) or more complex. For example, once contamination is observed in a particular system 600, i.e. by a particular control module 610, then shut off of other systems might be done in some progressive manner. Such progressive manner might be dependent on time parameters, observed level of contamination, the manner in which central water valves might be turned off to isolate the contamination, the observed flow pattern of water in the area of the observed contamination, and/or other parameters. Such shut off of systems, done in some progressive manner, may be performed by a suitable algorithm.

Further embodiments are hereinafter described with reference to FIG. 11 through FIG. 36.

Figure 11:
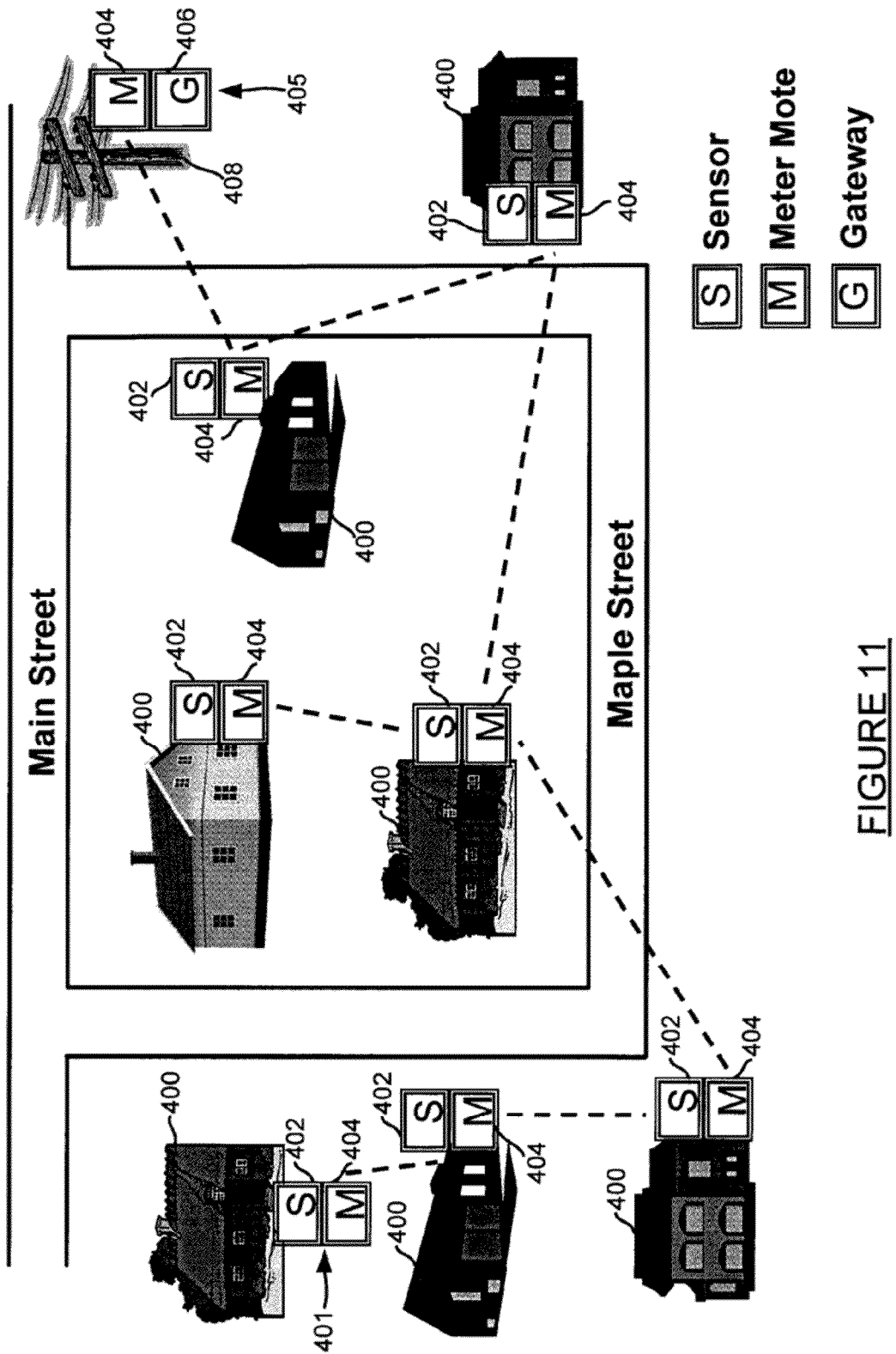
FIG. 11 is a system block diagram of an example embodiment deployed in a residential neighborhood.

FIG. 11 shows a typical "cluster" of residences 400 each having an embodiment of a wireless reporting water meter referred to herein as "METER Mote" 401. As FIG. 11 shows, each METER Mote 401 includes a sensor 402 and a wireless mote 401. The METER Motes can collect data at their individual locations and route the data back either directly to a central collection point 405, referred to herein as a collector or a "StarGate" or a Gateway or through another METER Mote wireless mote 404. The StarGate collector 405 collects the data from each METER Mote 401 in the cluster and has its own address within the communications system. The StarGate 405 can connect to a Communications network, a WiFi network or a cellular system. As FIG. 11 illustrates, the StarGate 405 can be positioned on a utility pole within a neighborhood.

The METER Mote System may be comprised of six main components: a Flow Measuring Element 402, a Wireless Sensor Network Mote 404, a flow isolation valve system 115, 116, a water pressure/quality detector (not shown), an Antenna System 315 and the Collector 405. A METER Mote registration device can replace the "traditional" registration device that normally would house the totalizer and automatic meter reading circuitry (AMR) if utilized. The METER Mote registration device may consist of the Wireless Sensor Network Mote, measuring circuitry and the water powered charging circuit. The wireless registration device may fit inside the housing of a traditional water meter head, such as the Badger Meter Model 25.

Figure 12:
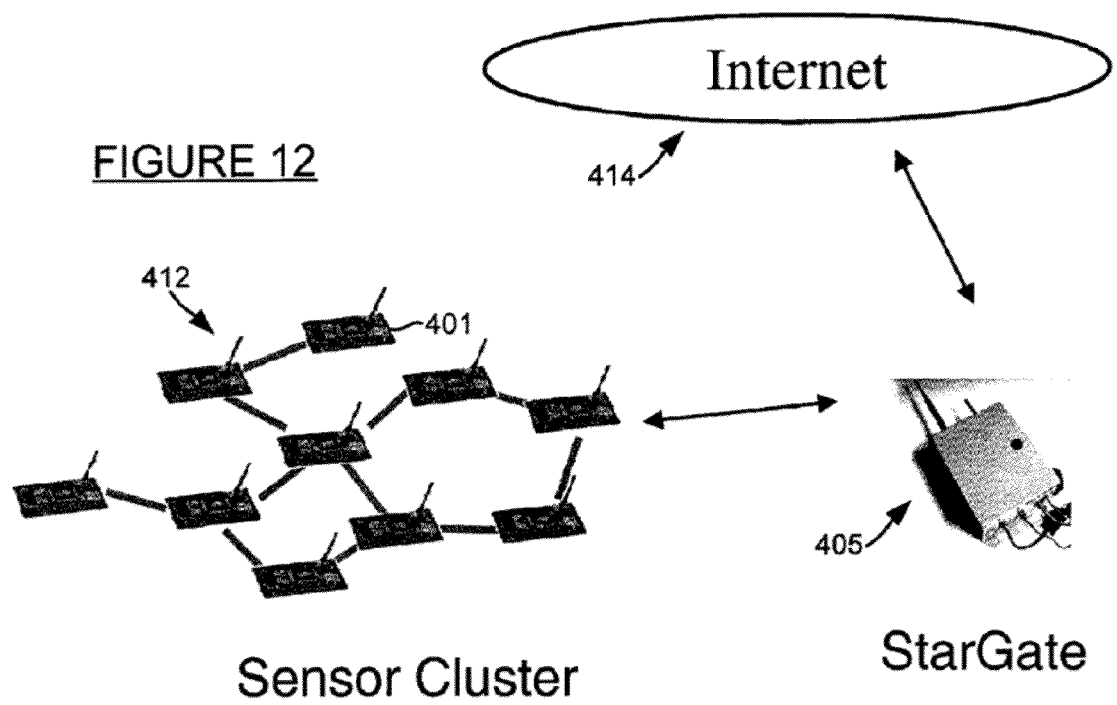
FIG. 12 is another system block diagram of an example embodiment.

The wireless motes 404 use mesh networking technology to form a wireless sensor network of METER Motes 401, or a sensor cluster 412 as illustrated in FIG. 12. Each sensor cluster 412 connects to a collector 405 to transmit data from the members of the cluster. Communication between Motes 401 and the collector 405 is through a process called multihop mesh networking which is a self-organizing and self-healing communication protocol. Multihop mesh networking allows each METER Mote to be both a sensor (e.g., data collector) and a router (e.g., a network router), and to automatically create a data path to a central collection point. Multihop mesh networking enables power management and exploits multi-path reflections, as experienced in neighborhood deployments, for better RF coverage. Data delivered to the collector 405 can then be accessed via Ethernet, WiFi or cellular data network connections via the Internet. The collector 405 can send data directly to an operations base. So configured, the system can provide users with real time access to any meter in the network and communication can be two-way.

Figure 13:
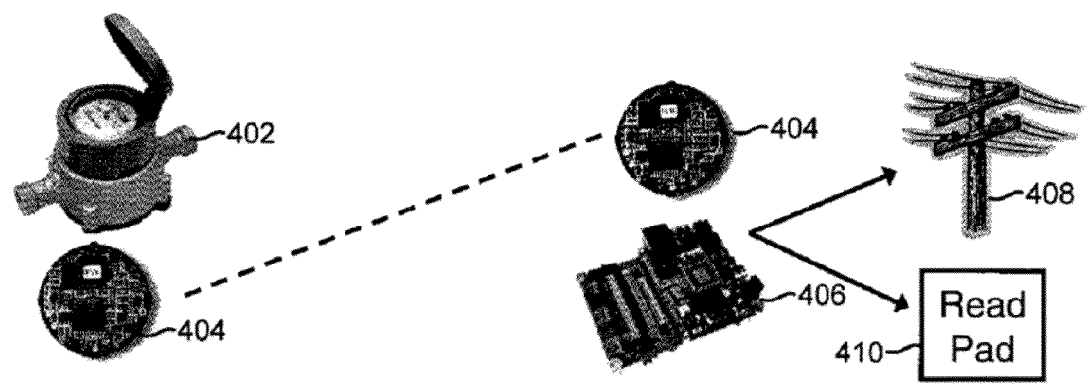
FIG. 13 is a system block diagram including photographs of component elements of an example embodiment.
Figure 14:
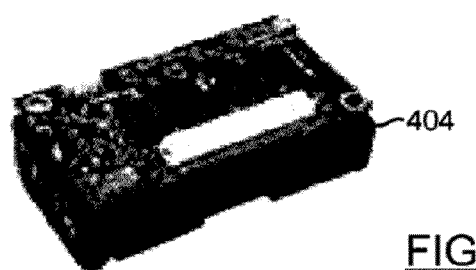
FIGS. 14 and 15 are photographs of example wireless motes suitable for use in various embodiments.
Figure 15:
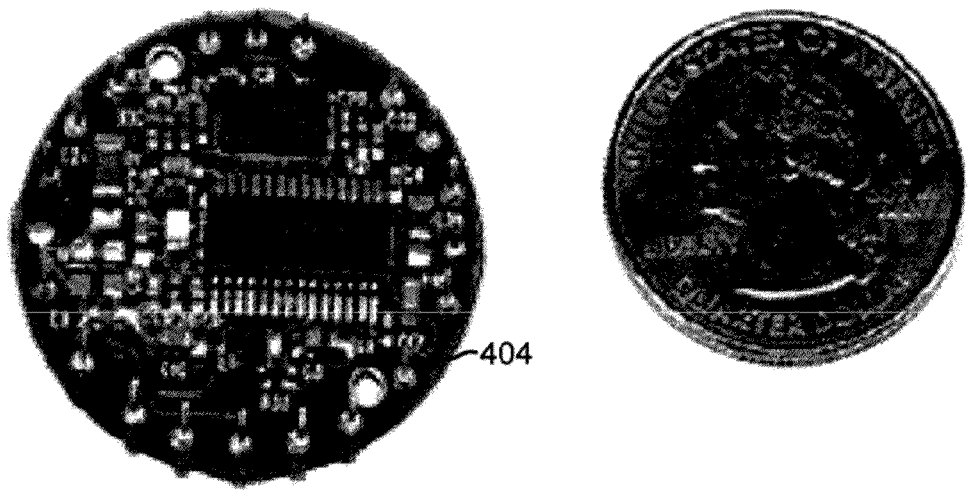

The wireless mote 404 in both the METER Mote sensors 401 and the collector 405 may be a MICA2 Dot previously manufactured by Crossbow Technologies as illustrated in FIG. 13. As another example, the wireless mote 404 may be MICA2 Mote developed by Crossbow Technologies as was used in a prototype system. Illustrated in FIG. 14, the MICA2 has a low cost, low powered on-board processor, 916 MHz radio and sensor board that can support water flow measurement, backflow detection and water pressure information. A water powered charging circuit (described more fully below) can replace the battery package shown in FIG. 14. The MICA2 also has over 500 k bytes of on-board memory, allowing the storage of multiple water flow and sensor reads. The METER Mote can store water flow and sensor reads in nonvolatile memory, ensuring no loss of data in the event of power loss. Wireless motes 404 are small in size, as illustrated by the MICA2 Dot mote shown next to a quarter in FIG. 15. The METER Mote embodiment may use an off-the-shelf product from Crossbow Technologies called the StarGate as the Collector 405. The Collector's role is to act as a bridge between the individual METER Motes 401 and the outside world. The StarGate can be tasked by a utility company to collect data from its respective METER Motes 401 and route the data back via a secure communications connection. The Collector 405 can be mounted next to a cable junction box, allowing easy access to a communications network.

The METER Mote System prototype can use an off-the-shelf positive displacement disk type Flow Measuring Element called a "nutating" disk. A nutating disk displaces a specific volume of water at each rotation caused by the water pressure. Each "nutation" drives an output magnet that allows the accurate measurement of water flow. Current water meters measure the number of nutations by magnetically engaging a magnet in the Registration Device, which is physically separated from the Flow Measuring Element, to drive the gear train of a register.

Figure 16:
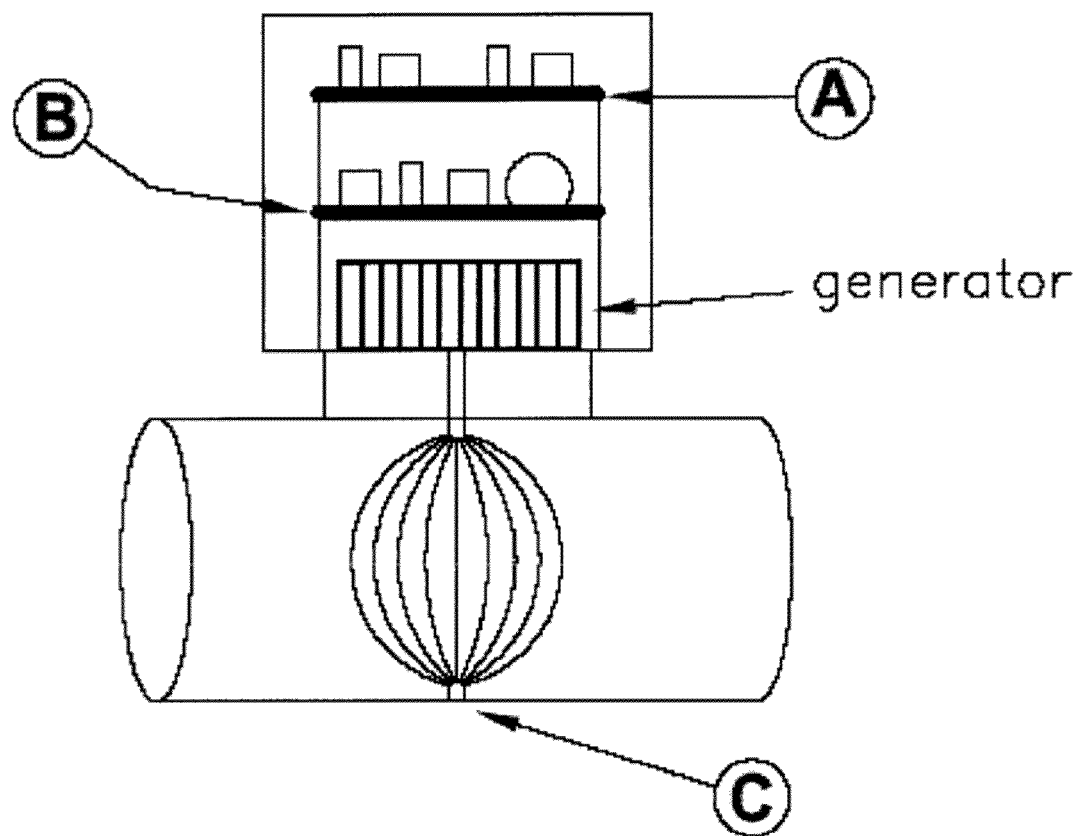
FIG. 16 is a component block diagram of an example embodiment of a sensor and wireless mote assembly and energy harvesting circuitry.
Figure 17:
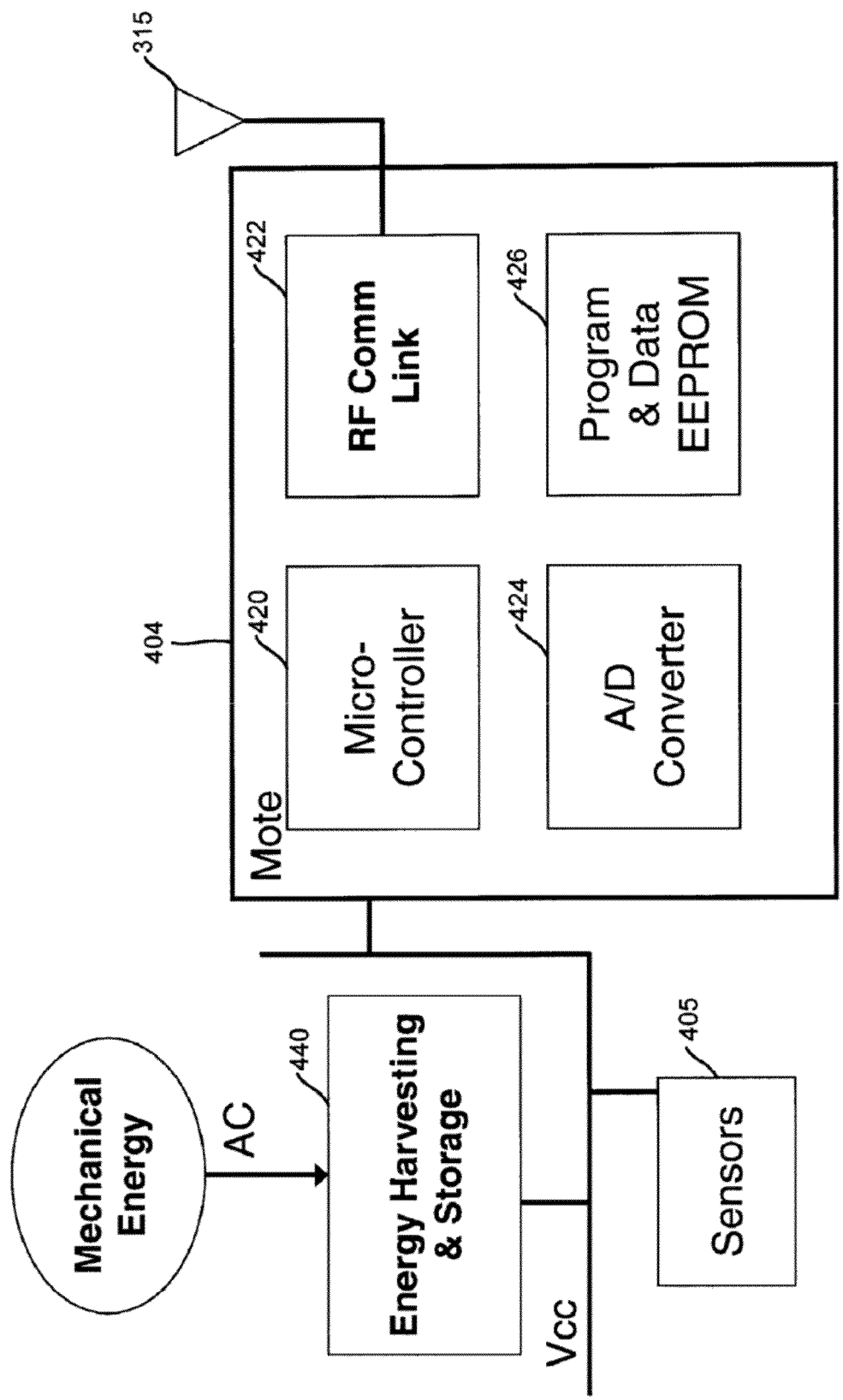
FIG. 17 is a circuit block diagram of an example embodiment of sensor and wireless mote assembly and energy harvesting circuitry.

In addition to using the nutating action to measure water flow, the METER Mote 401 can scavenge power for the on-board electronics by electromagnetic induction. As illustrated in FIG. 16, the METER Mote 401 embodiment includes an inline micro-turbine or nutating disk C that drives a generator the power from which is controlled and stored in a power supply, battery and capacitor circuit B and used to power the wireless mote electronics A. As illustrated in FIG. 17, mechanical energy from water flow is captured by an energy harvesting and storage unit 440 in order to provide a voltage source Vcc for sensors 405 and the wireless mote 404. A key advantage of the METER Mote embodiment is the ability to power itself from the water pressure in the residential water system. In addition, the ability to recharge a storage circuit from water flow can support future expansion and allow for duty cycle growth.

The METER Mote embodiment utilizes a unique charging circuit that uses super capacitors as the primary power source and a lithium battery as the secondary power source, in accordance with one embodiment of the invention. This design may be needed as current battery technology may support 300 to 500 recharge cycles. This limitation reduces effective battery lifetime, meaning that batteries cannot be used as the sole power source. Capacitors have virtually unlimited recharge cycle life and are ideal for frequent "pulsing" applications, such as residential water flow. Assuming a water usage duty cycle of 20% and a METER Mote duty cycle of 1%, calculations indicate a $1/10$ Watt power output from the water powered charging circuit can be enough to provide power to the METER Mote embodiment for approximately 20 years. However, it is appreciated that the systems and methods are not limited to a particular type of battery. In one embodiment, the invention might utilize a thin film battery, such as a thin film lithium ion battery. Such batteries are constructed of thin materials resulting in a battery that is of very thin construction.

Figure 18:
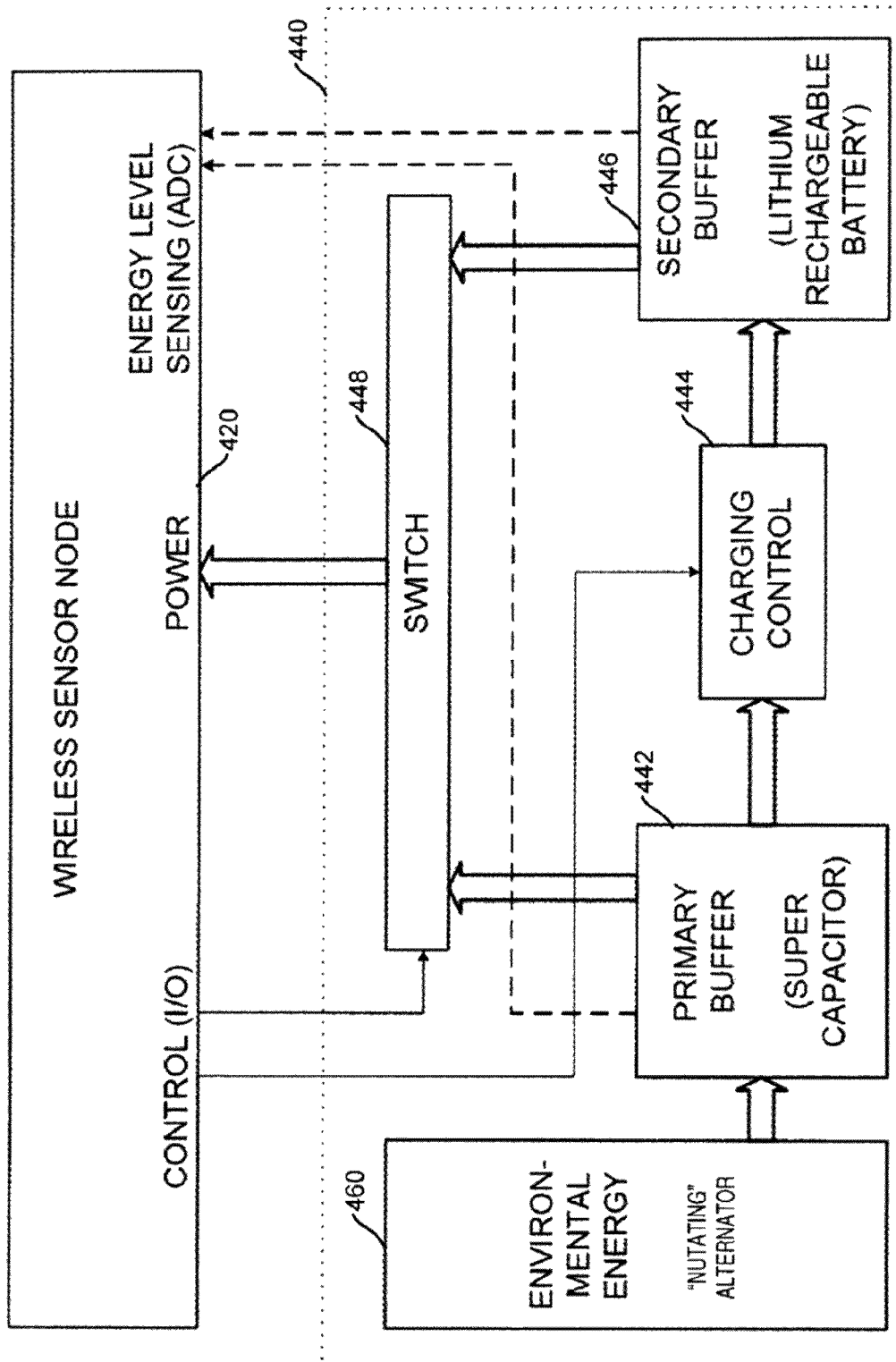
FIG. 18 is a system architecture of a power generator portion of an example embodiment of sensor and wireless mote assembly.

The water powered charging circuit design, which is illustrated in FIG. 18, is simplified by allowing the on-board processor 420 of the wireless mote 404 to have complete control over buffer selection and charging, directing the METER Mote 401 via switch 448 to draw power from the super capacitor 442 first thereby minimizing the charge cycles the battery 446 is subjected to. This architecture supports future sophisticated power management schemes.

Mechanical energy from the flow of water is converted into electrical energy in the METER Mote embodiment using a unique generator design, details of which are illustrated in FIGS. 19-32. Referring to FIG. 19, a magnetic field is caused to rotate by magnetically coupling a rotor to a drive shaft connected to a micro-turbine of nutating disk C. As the magnetic field rotates through the coils, electricity is caused to flow first in one direction (Step #2) and then in the opposite direction (Step #4).

Figure 20:
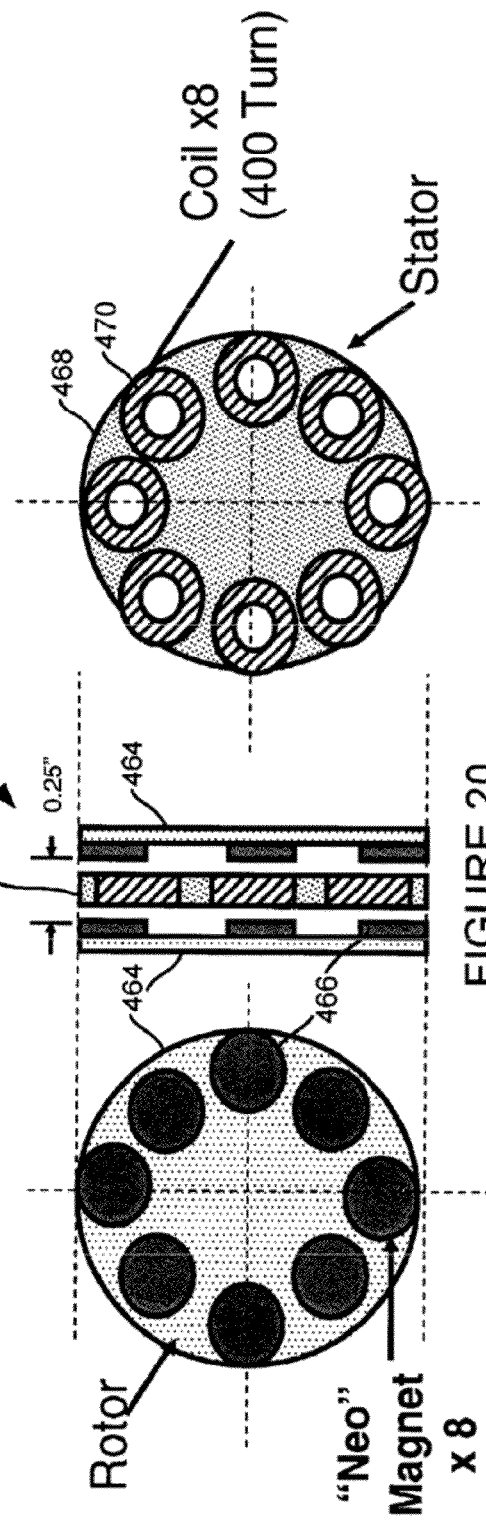
FIG. 20 includes two elevation views and a cross section views of the rotor and stator portions of a generator of an example embodiment of sensor and wireless mote assembly.

Details of the generator assembly 462 are illustrated in FIG. 20 which shows a cross section of the assembly 462 and elevation views of the rotors 464 and stator 468. The generator assembly is a miniature axial flux permanent magnet generator (AFPMG). It includes a single stator 468 which is configured as a disk including eight coils 470 wired in a single phase and approximately equally spaced about the disc. The stator is positioned between two rotors 464 each including eight permanent ½ inch diameter permanent magnets 466. In an embodiment the permanent magnets are NdFeB Grade 42 permanent magnets 0.5 inch in diameter and 0.125 inch high. The rotors are magnetically conductive plates, such as silicon steel (electrical steel). The magnets on the two rotors 464 are configured so the magnets 466 on the two rotors are in attracting positions. The rotors 464 are positioned in close proximity and on either side of the stator 468. In an embodiment, the rotors 464 are spaced just 0.25 inch apart when assembled and are approximately 2 inches in diameter.

Figure 21:
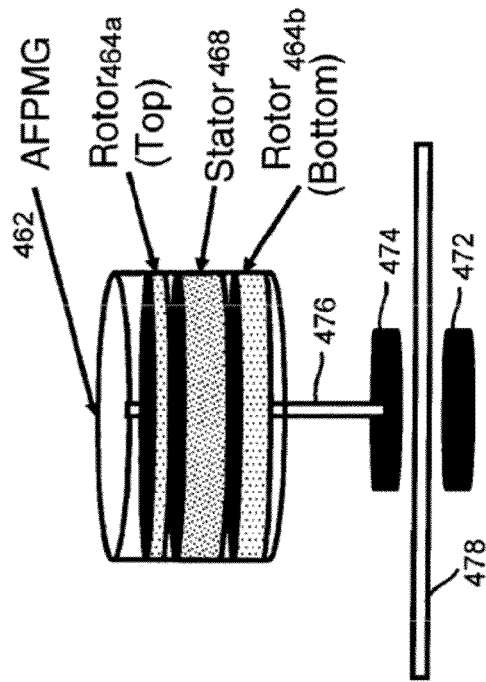
FIG. 21 is a cross sectional view of an assembled generator of an example embodiment of sensor and wireless mote assembly.
Figure 22:
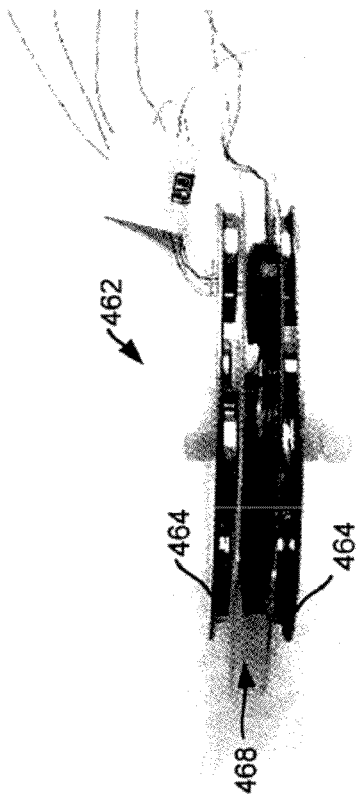
FIG. 22 is a photograph of a prototype stator and rotor assembly of the generator illustrated in FIG. 20.

The rotors 464 are suspended on a drive shaft 476 which is coupled to a first drive magnet 474 as illustrated in FIG. 21. The first drive magnet 474 is magnetically coupled to a second drive magnet 472, with the second drive magnet 474 being in the water chamber (e.g., wet side) of a housing membrane 478. The second drive magnet 472, also referred to herein as an output magnet, turns in response to rotations of a nutating disk C, which induces the first drive magnet 474 to rotate the rotors 468. A photograph of a prototype generator assembly 462 is provided as FIG. 22.

The magnetic orientations of rotor magnets 466 are illustrated in FIGS. 23 and 24. The eight permanent magnets 466 are approximately equally spaced about each rotor 464, i.e., 45 degrees apart, and arranged so that their polarity alternates. Thus, a magnet 466a with its south pole facing the rotor 464 is followed around the disk perimeter by a magnet 466b with its north pole facing the stator 468. Further, the polarity of magnets on the top rotor 464a and the bottom rotor 464b are oriented in an opposing manner. Thus, a magnet 466a on the top rotor 464a with its south pole facing the stator 468 is positioned directly above a magnet 466c with its north pole facing the stator 468. When assembled, this orientation of permanent magnets 466 on the two rotors 464 cause magnetic fields 480 to flow through adjacent coils 470 in the stator 468 and through the magnetically conductive plates 464 in the manner indicated by the dashed arrows in FIG. 24. In an embodiment, the flux density through the stator coils 470 is estimated to be approximately 2473 Gauss or 0.2473 Tesla. A photograph of a prototype rotor 464 is provided in FIG. 25.

Further details regarding a design of an embodiment of the stator 468 are presented in FIGS. 26-30. A photograph of a prototype coils 470 laid out in the orientation in which they can appear on the stator 468 is presented in FIG. 26. As illustrated in FIG. 27 the eight coils 270 are spaced evenly about the perimeter of the stator 468, i.e., at 45 degrees apart. In an embodiment, the coils 470 are each approximately 0.5 inch in diameter and approximately 0.1 inch thick and include 400 wraps exhibiting approximately 8 ohms resistance. In an embodiment, the coils 470 are sandwiched between 0.015 inch thick (approximately) clear styrene. In an embodiment, the stator 468 is approximately 2 inches in diameter so that it may fit within the housing 482 of a conventional water meter, such as the housing 482 shown in FIG. 28.

The winding orientations and electrical interconnections of the eight coils 470 in the stator 468 are illustrated in FIGS. 29 and 30. FIG. 29 illustrates how the eight magnets 466 in one rotor 464 can match up to the eight coils 470 designated as A1-A4 and B1-B4. As FIGS. 29 and 30 reveal, the coils are wired in series but interconnected so that adjacent coils have opposite winding orientations so that the eight coils have a single phase connection.

Figures 31, 32:
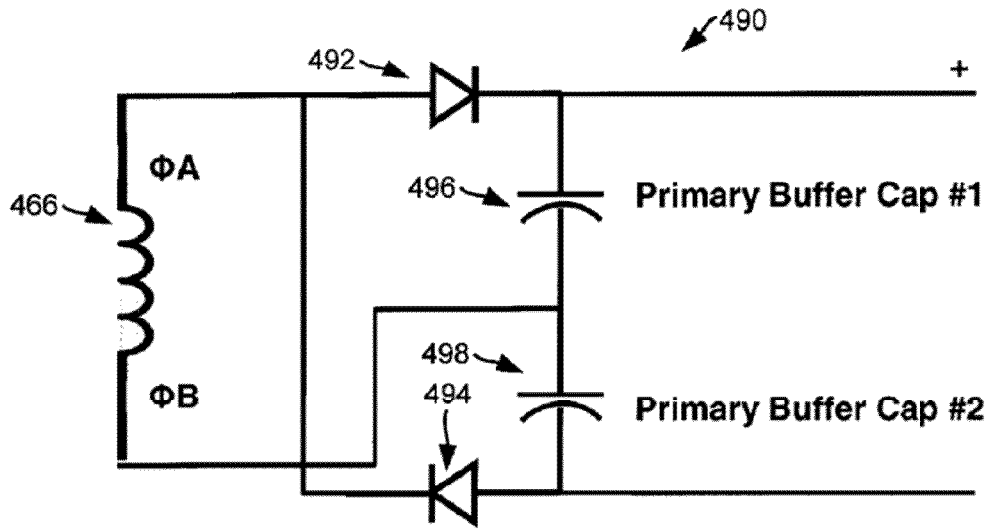
FIG. 31 is a circuit diagram of an example rectifier useable in an example embodiment of a generator of an example embodiment of sensor and wireless mote assembly.
FIG. 32 includes two tables showing test results of two prototype generators.

Current output from the generator can be rectified using a rectifier circuit, an example embodiment of which is illustrated in FIG. 31. In this example two germanium diodes 492, 494 rectify current from the stator coils 466 with output voltage stored in buffer capacitors 496 and 498.

Prototypes of the foregoing generator embodiments were tested and installed in two commercially available water meter housings, specifically a meter manufactured by Sensus and a meter manufactured by Hersey. Results of this prototype testing are presented in the tables provided in FIG. 32. As shown in the tables in FIG. 32, the embodiment described herein demonstrated output (>2 V) pole-to-pole voltage Vp-p and direct current voltage Vdc at low flow rates (1-2 GPM), and output voltage (>10 V) at moderate flow rates (5-10 GPM).

The measuring circuitry of the METER Mote 401 embodiment collects water usage data, and may detect any back-flow occurrence, monitor water pressure and upload the data to the central collection point. In an embodiment, the METER Mote 401 uses the MDA300 sensor board from Crossbow Technologies which has the ability to monitor eight analog inputs, monitor and control 8 digital inputs or outputs and includes two contact closure circuits. Rotation of the magnetic field generated by the second drive magnet 472 (FIG. 21) can be sensed by Hall effect sensors 500, an example of which is shown in FIG. 33. When the Hall effect sensors 500 are positioned about the shaft 476 where the magnetic field of the second drive magnet 472 is present at two angles about the shaft, such as 45-90 degrees of offset as shown in FIG. 34, the microcontroller 420 in the mote 404 can calculate the position of the rotor, and thus count turns of the nutating disc. An example logic table that may be implemented within the microcontroller 420 is illustrated in FIG. 35. Using such logic, the microcontroller can incremented a binary counter with each shaft rotation, and use the counter value to calculate water flow. The logic table illustrated in FIG. 35 can also be used to detect rotation direction, and thus detect backflow.

In an embodiment, each METER Mote 401 is configured with a duty cycle consisting of alternating periods of sleeping and activity. In order to conserve power most of the time the mote is sleeping. When the mote 404 is awake it needs to perform several functions, including power management, water meter readings and communication. The mote microcontroller 420 can be configured via software to support this functionality via a power management phase, a wakeup synchronization phase, a meter reading phase and a communication phase. An example process flow for these functions and phases is provided in FIG. 36.

Figure 36:
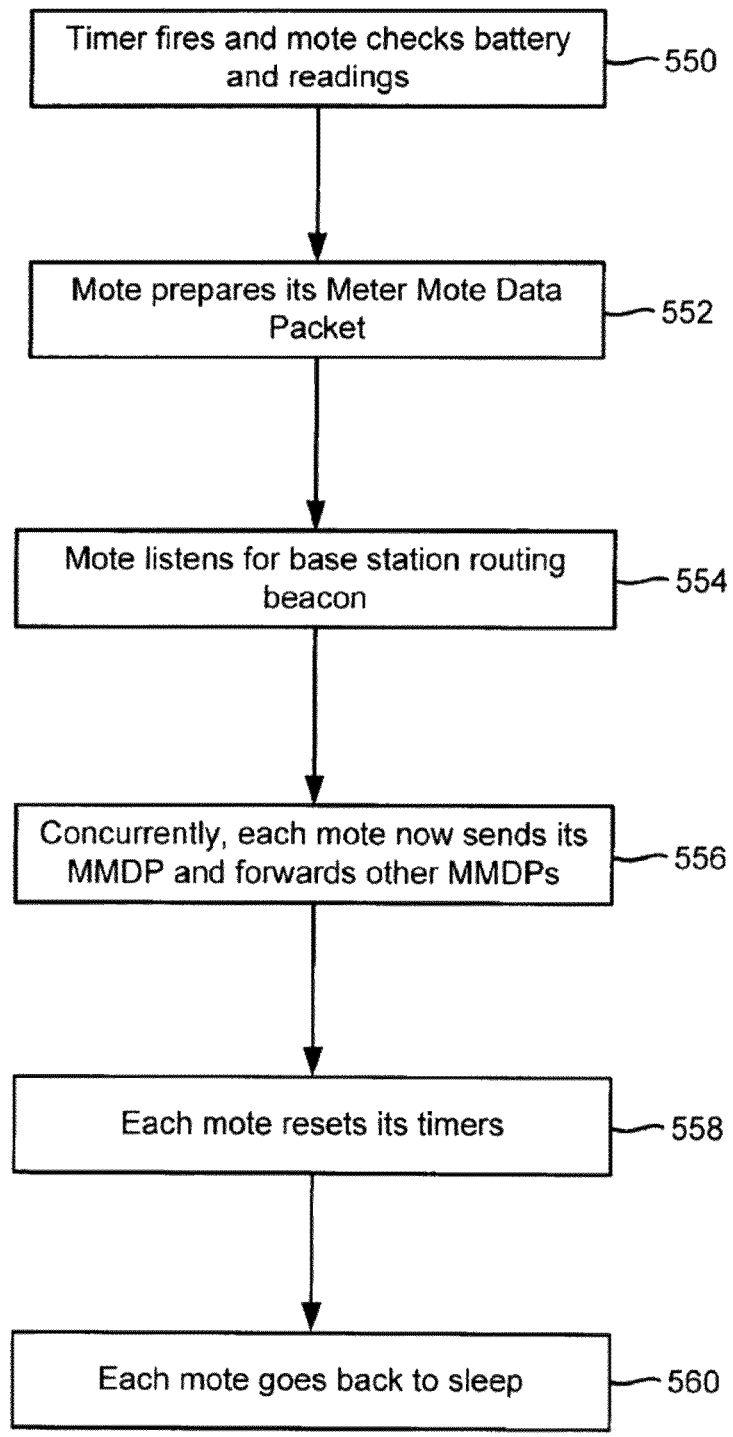
FIG. 36 is a process flow diagram of a method of operating an embodiment sensor and wireless mote assembly.

When each mote wakes up it checks its available power and decides which power source to use during that phase, step 550. At this time the mote also can change the charging cycle for the lithium battery. After this phase the mote may enter a wakeup synchronization phase. This phase may be implemented because motes must wake up at roughly the same time, meaning that each mote's internal clock must be closely re-synchronized with the other motes in the system. At the start of the phase the base station may issue a command to run a time synchronization protocol. Alternatively, the time synchronization process may be implemented after data has been transmitted as illustrated in FIG. 36 as step 558. In an embodiment, the synchronization protocol is based upon one of the standard algorithms available in the TinyOS software release. TinyOS is a standard operating system for wireless sensor networks (WSN). This phase may take several minutes to complete. During this phase mesh routing paths may be established. The outcome of this phase is that all the clocks can be synchronized with each other for several more duty cycles and mesh networking routes are established.

During the next phase each mote "reads its meter." The meter reading consists of the current value, and this value is time-stamped to indicate when the reading was performed. The time-stamped value is then stored in local mote memory.

During the fourth phase the motes 404 prepare data packets, step 552, and start to communicate data back to the base station. As part of this phase each mote may listen for a base station or collector 405 routing beacon, step 554. Each mote 401 is responsible for sending in its own value and for forwarding information received from other motes. This forwarding activity is part of the WSN mesh networking architecture. In an embodiment, the motes 401 uses the TinyOS Multi-Hop Routing protocol for mesh networking. This protocol allows data and control information to be sent from the METER Mote system to the communications network.

A novel feature concerns techniques for data packet optimization. A traditional approach for reporting sensing readings is to have each packet write its value into the packet, and then simply have each intermediate sensor node forward that packet. However, in an environment with significant levels of interference frequent packet losses can be substantially lower the success rate of each mote 404 reporting in. In an embodiment these problems are overcome by allowing each mote 404 to piggyback the reports from other motes into its own report, step 556. This automatically increases the likelihood that at least one of the motes reports can make it back to the base station or collector 405.

Since each TinyOS packet has a limited amount of space, it is necessary to compress the amount of data each mote 404 sends, since multiple readings need to be contained in a single packet. This may be achieved using several techniques. In an embodiment, a bitmap representation is used to signify from which mote 401 the data is coming from, and what the message is (status or alarm). Each bitmap contains space to signify node id and type of message. The advantage of this embodiment is that reports can become highly compressed. Further, each mote 401 can rapidly add its own values by simply performing bit level operations such as a logical AND. The piggyback operation is therefore performed at chip level speeds. Using a logical time stamping technique the time that the data was sampled can be represented, thereby significantly lowering the amount of space required in each report data packet.

After data has been transmitted, each mote may reset it timer, step 558, if that process has not already been performed. With all functions completed, each mote can go back to sleep until the next scheduled wake up, step 560.

The software architecture used to configure the mote microcontroller 420 can use standard modular programming techniques. This approach allows future implementations to easily incorporate greater functionality, such as communications network to METER Mote 401 communication for additional control information, such as value shutoff, or protocols for security and confidentiality.

The embodiments of the present inventions are not to be limited in scope by the specific embodiments described herein. For example, although many of the embodiments disclosed herein have been described in the context of systems and methods for performing remote water meter monitoring, other embodiments, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Many modifications to the embodiments described above can be made without departing from the spirit and scope of the invention. Accordingly, the claims set forth below should be construed in view of the full breadth and spirit of the embodiments of the present inventions as disclosed herein. Also, while the foregoing description includes many details and specificities, it is to be understood that these have been included for purposes of explanation only, and are not to be interpreted as limitations of the present invention.

What is claimed is:

1. A remote water meter monitoring system comprising:
a water meter body coupling a water supply source to a water customer;
a flow meter contained within the water meter body that is configured to measure a flow rate of water through the water meter;
a power supply system including at least one battery and a power generator,
wherein the power generator is powered by a flow of water through the water meter body; a controller communicatively coupled to the water meter body and power supply system; and at least one antenna connected to the controller; and
the at least one antenna including:
a meter pit cover containing a through-hole;
an insert disposed in the through-hole of the meter pit cover, the insert containing an exciter loop; and
an electrically conductive plate attached to the insert, the electrically conductive plate disposed below and coupled in parallel with the meter pit cover, wherein the electrically conductive plate conducts radio frequency signals.

2. The system according to claim 1, wherein the controller and antenna are configured to transmit and receive information from and send information to the system.

3. The system according to claim 2, wherein the controller and antenna are configured to send water usage information wirelessly to a bridge device.

4. The system according to claim 3, wherein sending water usage information comprises sending information either directly or through one or more other water meter monitoring systems.

5. The system according to claim 3, wherein the system is configured to receive at least one command from the wireless bridge device; and wherein the at least one command is a command selected from the group consisting of a meter reading transmission request, a status request, and a water shutoff request.

6. The system according to claim 1, wherein the electrically conductive plate is circular in shape with a central aperture through which the insert is disposed.

7. The system according to claim 6, wherein the electrically conductive plate is sandwiched between a shoulder of the insert and a conductive plate nut that is threadably attached to the insert.

8. The system according to claim 6, wherein the electrically conductive plate is disposed in a plane parallel to the meter pit cover.

9. The system according to claim 1, wherein the exciter loop is disposed relative to the meter pit cover such that a portion of the exciter loop extends above a top surface of the meter pit cover.

10. The system according to claim 9, wherein the exciter loop is electronically connected to a coaxial cable, and the coaxial cable is electronically connected to an RF connector.

11. The system according to claim 10, further including at least one annular bead that is disposed about the coaxial cable.

12. The system according to claim 11, the at least one annular bead being constructed of ferrite.

13. The system according to claim 1, wherein the water meter body further comprises a shut off valve; and wherein the shut off valve may be remotely activated by a wireless signal received by the system.

14. The system according to claim 13, wherein the flow sensor is adapted to detect reverse water flow and to cause the shut off valve to trigger when reverse water flow exceeds a predetermined volume.

15. The system according to claim 1, wherein the water meter further comprises at least one water quality sensor;
wherein the controller is configured to send periodic water usage information wirelessly to the water customer; and
wherein the system is remotely addressable via a communications network with a network content browser.

16. The system according to claim 1, wherein the antenna further comprises:
a radio frequency connector connected to the insert distal from the exciter loop; and
a pit cover nut disposed on the insert, the nut holding the insert in position relative to the meter pit cover.

17. A wireless remote water meter monitoring network comprising:
at least one central data processing system; at least one bridge device communicatively coupled to the at least one central data processing system; and a plurality of network nodes, each network node configured to perform two-way communication with the at least one bridge device, either directly or through one or more other network nodes,
wherein each network node comprises:
a water meter housing coupling a water customer with a water supply line;
a flow measurement device in the water meter housing for measuring a volume of water flowing through the meter;
a power supply circuit including at least one power storage device and a power converter, wherein the power converter is powered by water flow through the meter; and
a communication circuit comprising a mesh-type controller and an antenna, wherein the communication circuit is coupled to the flow measurement device and the power supply circuit and is adapted to perform two-way communication; and
the antenna including:
a meter pit cover containing a through-hole;
an insert disposed in the through-hole of the meter pit cover, the insert containing an exciter loop; and
an electrically conductive plate attached to the insert, the electrically conductive plate disposed below and coupled in parallel with the meter pit cover, wherein the electrically conductive plate conducts radio frequency signals.

18. The network according to claim 13, wherein the water meter further comprises a shut off valve operable to prevent water from flowing from the supply to the customer and configured for remote shut off via the communication circuit.

19. The network according to claim 18, wherein the shut off valve is configured for remote shut off based on water consumption of a customer.

20. The network according to claim 18, wherein the shut off valve is configured for remote shut off based on observed water contamination.

21. The network according to claim 13, wherein the antenna of the communication circuit includes an exciter loop, a portion of the exciter loop extending above the meter pit cover.

22. A circuit for a wireless water meter monitoring system comprising:
a mechanical energy harnessing sub-circuit for converting water flow mechanical energy into electrical energy comprising a pair of magnetically coupled rotors driven by water flow and having a plurality of magnets affixed thereto that rotate around a set of coils, thereby inducing a current in the coils;
an energy storage and delivery sub-circuit comprising at least one rectifier circuit electrically coupled to the coils, at least one capacitor charged by the at least one rectifier circuit, at least one battery, and a switch for permitting the at least one battery to be charged by the at least one capacitor and for selecting either the at least one capacitor or the at least one battery to supply continuous power to the circuit and to manage charging of the at least one battery;
a water flow counting sub-circuit comprising a plurality of flux change detectors that detect flux changes caused by a magnet rotating about a shaft driven by a flow meter of a water flow chamber; a communication sub-circuit electrically coupled to the energy storage and delivery sub-circuit and the water flow counting sub-circuit comprising a mesh-type transceiver and an antenna for enabling two-way communication between the wireless water meter monitoring system and other systems; and
a sensor sub-circuit electrically coupled to the energy storage and delivery sub-circuit and the communication sub-circuit for recording sensor data and comprising at least one sensor device; and
the antenna including:
a meter pit cover containing a through-hole;
an insert disposed in the through-hole of the meter pit cover, the insert containing an exciter loop; and
an electrically conductive plate attached to the insert, the electrically conductive plate disposed below and coupled in parallel with the meter pit cover, wherein the electrically conductive plate conducts radio frequency signals.

23. The circuit according to claim 22, wherein the sensor sub-circuit comprises a plurality of Hall effect switches for detecting a water flow through the meter and a counter device for quantifying the water flow into a flow rate.

24. The circuit according to claim 22, wherein the sensor sub-circuit comprises at least one sensor selected from the group consisting of a water pressure sensor, a water composition sensor, and a temperature sensor.

25. The circuit according to claim 22, further comprising a water flow shut off sub-circuit coupled to the communication sub-circuit and the energy storage and delivery sub-circuit for preventing a water flow to a customer associated with the water meter in response to a command received from the communication sub-circuit.

26. The circuit according to claim 22, wherein the communications sub-circuit comprises an embedded microprocessor executing a control program for recording information from the sensor sub-circuit and the water flow counting sub-circuit and for periodically transmitting this recorded information to a remote system.

* * * * *